United States Patent
Li et al.

(10) Patent No.: US 10,455,504 B2
(45) Date of Patent: Oct. 22, 2019

(54) DATA TRANSMISSION METHOD AND DEVICE, BASE STATION AND USER EQUIPMENT

(71) Applicant: ZTE Corporation, Shenzhen (CN)

(72) Inventors: Xincai Li, Shenzhen (CN); Wei Gou, Shenzhen (CN); Feng Bi, Shenzhen (CN); Focai Peng, Shenzhen (CN); Ling Yang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/547,298

(22) PCT Filed: Dec. 10, 2015

(86) PCT No.: PCT/CN2015/097033
§ 371 (c)(1),
(2) Date: Jul. 28, 2017

(87) PCT Pub. No.: WO2016/119530
PCT Pub. Date: Aug. 4, 2016

(65) Prior Publication Data
US 2018/0027493 A1 Jan. 25, 2018

(30) Foreign Application Priority Data
Jan. 30, 2015 (CN) .......................... 2015 1 0054861

(51) Int. Cl.
*H04W 16/14* (2009.01)
*H04W 52/02* (2009.01)
(Continued)

(52) U.S. Cl.
CPC ....... *H04W 52/0216* (2013.01); *H04L 5/0055* (2013.01); *H04L 5/14* (2013.01);
(Continued)

(58) Field of Classification Search
CPC ......... H04W 52/0216; H04W 72/1289; H04W 72/121; H04W 72/12; H04W 74/0808;
(Continued)

(56) References Cited

U.S. PATENT DOCUMENTS 9,717,098 B2 * 7/2017 Bhushan ............ H04W 28/0289
9,794,821 B2 * 10/2017 Jeon .................. H04W 28/0205
(Continued)

FOREIGN PATENT DOCUMENTS

| CN | 102111256 A | 6/2011 |
|---|---|---|
| CN | 103580840 A | 2/2012 |
| CN | 102812772 A | 12/2012 |

OTHER PUBLICATIONS

International Search Report for corresponding application PCT/CN2015/097033 filed on Dec. 10, 2015; dated Mar. 15, 2016.
(Continued)

*Primary Examiner* — Phuc H Tran
(74) *Attorney, Agent, or Firm* — Cantor Colburn LLP

(57) ABSTRACT

Provided are a data transmission method and device, a base station, and a User Equipment (UE). The method includes: sending a pre-scheduling signaling to a UE before competing for an unlicensed carrier, the pre-scheduling signaling for instructing the UE to transmit data on an unlicensed resource obtained by competition; and transmitting the data with the UE according to the pre-scheduling signaling.

16 Claims, 8 Drawing Sheets

(51) Int. Cl.
*H04W 72/12* (2009.01)
*H04L 5/00* (2006.01)
*H04L 5/14* (2006.01)
*H04W 72/14* (2009.01)
*H04W 74/08* (2009.01)

(52) U.S. Cl.
CPC ......... *H04W 72/12* (2013.01); *H04W 72/121* (2013.01); *H04W 72/1289* (2013.01); *H04W 72/1215* (2013.01); *H04W 72/14* (2013.01); *H04W 74/0808* (2013.01); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/1264* (2018.01); *Y02D 70/142* (2018.01); *Y02D 70/25* (2018.01)

(58) Field of Classification Search
CPC .... H04W 72/1215; H04W 72/14; H04L 5/14; H04L 5/0055; Y02D 70/10; Y02D 70/12; Y02D 70/25; Y02D 70/126; Y02D 70/00; Y02D 70/1262; Y02D 70/1264; Y02D 70/142
See application file for complete search history.

(56) References Cited

U.S. PATENT DOCUMENTS

| | | | |
|---|---|---|---|
| 9,883,404 B2* | 1/2018 | Malladi | ................ H04W 16/14 |
| 2005/0003794 A1 | 1/2005 | Liu | |
| 2013/0343288 A1 | 12/2013 | Ratasuk | |
| 2014/0029561 A1 | 1/2014 | Kim | |
| 2014/0036818 A1* | 2/2014 | Koskela | ............ H04W 72/1231 370/329 |
| 2014/0036853 A1 | 2/2014 | Kim | |
| 2014/0112289 A1* | 4/2014 | Kim | ....................... H04W 16/14 370/329 |
| 2014/0335876 A1 | 11/2014 | Ratasuk | |
| 2014/0362780 A1 | 12/2014 | Malladi | |
| 2015/0312793 A1* | 10/2015 | Jeon | .................. H04W 28/0205 370/329 |
| 2017/0311337 A1* | 10/2017 | Mo | ....................... H04W 72/12 |
| 2017/0367106 A1* | 12/2017 | Kim | ......................... H04L 5/00 |
| 2018/0019836 A1* | 1/2018 | Kim | ..................... H04J 11/0079 |

OTHER PUBLICATIONS

CATT: "Listen before talk for LAA", 3GPP Draft, vol. RAN WG1, No. San Francisco, US 20141117-20141121, Nov. 17, 2014, XP050875712.

European Search Report for corresponding application 15879728; Report dated Jan. 24, 2018.

LG Electronics:, "Candidate Solutions for LAA Operation", 3GPP Draft, vol. RAN WG1, No. Ljubljana Slovenia, 20141006-2014010, Oct. 5, 2014, XP050875341.

ZTE, "Analysis of LAA UL Enhancement", 3GPP Draft; vol. RAN WG1, No. San Francisco, US, 20141117-20141121, Nov. 17, 2014, XP050875896.

\* cited by examiner

DATA TRANSMISSION METHOD AND DEVICE, BASE STATION AND USER EQUIPMENT

TECHNICAL FIELD

The present disclosure relates to the field of communications, and more particularly to a data transmission method and device, a base station, and a User Equipment (UE).

BACKGROUND

In an evolution process of Long Term Evolution (LTE), the project of LTE Rel-13 version had been researched since September, 2014, and one of important tasks is about the LTE system using an unlicensed carrier. This technology will enable the LTE system to use the current unlicensed carrier, which greatly improve potential spectrum resources of the LTE system and enable the LTE system to obtain spectrum at a lower cost.

However, the data transmission is performed in a LTE system by using the unlicensed carrier will face a lot of problems. Some of these problems are as follows.

On an unlicensed spectrum, besides the LTE/LTE-Advanced (LTE-A) system, other systems such as Wireless Fidelity (WiFi) and radar also exist. For fairness, each system needs to acquire resources in a competition manner, and the obtained resources need to be released after being occupied for a period of time. Therefore, LTE needs to efficiently utilize the obtained resources within limited occupation time.

If uplink data of a UE is transmitted on the unlicensed carrier, a base station or the UE needs to obtained resources by itself through competition, and the interval between the time for sending an uplink scheduling grant by the base station and the time for transmitting the uplink data by the UE is 4 ms. The spectrum resources have been released probably within this period of time, and therefore the utilization rate of the resources is low.

Therefore, the problems of discontinuous data transmission and low resource utilization caused by resource competition and resource occupation time limitations when transmitting data by using an unlicensed carrier exist in the related art.

SUMMARY

The embodiments of the present disclosure provide a data transmission method and device, a base station, and a UE, which are used to at least solve the problems in the related art of discontinuous data transmission and low resource utilization caused by resource competition and resource occupation time limitations when transmitting data by using an unlicensed carrier.

According to one aspect of the embodiment of the present disclosure, a data transmission method is provided. The method includes: sending a pre-scheduling signaling to a UE before competing for an unlicensed carrier, the pre-scheduling signaling for instructing the UE to transmit data on an unlicensed resource obtained by competition; and transmitting the data with the UE according to the pre-scheduling signaling.

In some embodiments, the pre-scheduling signaling includes at least one of the following information: carrier index of the unlicensed carrier, positions of Physical Resource Blocks (PRB) allocated to the UE, the number of the PRBs, a Modulation and Coding Scheme (MCS), subframe position index about data transmission of the UE on the unlicensed carrier, and a process number of a Hybrid Automatic Repeat Request (HARQ) for data retransmission of the UE.

In some embodiments, before sending the pre-scheduling signaling to the UE, the method further includes: determining the UE to which the pre-scheduling signaling is sent according to at least one of the following information: a Scheduling Request (SR), a Buffer Status Report (BSR), a service and service priority of a UE, and a geographic position of a UE.

In some embodiments, the step of sending a pre-scheduling signaling to a UE before competing for an unlicensed carrier includes at least one of the following: sending the pre-scheduling signalings corresponding to multiple UEs to the multiple UEs on multiple subframes respectively; and sending the pre-scheduling signalings to the UEs according to a pre-set UE scheduling order.

In some embodiments, transmitting the data with the UE according to the pre-scheduling signaling includes one of the following: when a base station obtains the unlicensed carrier by competition, sending, to the UE, a triggered scheduling signaling for instructing to transmit the data with the UE; transmitting the data with the UE according to the pre-scheduling signaling and the triggered scheduling signaling; and when the UE obtains the unlicensed carrier by competition, transmitting the data with the UE according to the pre-scheduling signaling.

In some embodiments, the triggered scheduling signaling for instructing to transmit the data with the UE is sent to the UE in at least one of the following ways: sending a pre-set sequence on a pre-set licensed carrier and/or a pre-set unlicensed carrier, the pre-set sequence including the triggered scheduling signaling for instructing to transmit the data with the UE on the unlicensed carrier obtained by competition; informing the UE through a physical signaling, the physical signaling including the triggered scheduling signaling for instructing to transmit the data with the UE on the unlicensed carrier obtained by competition; and sending an occupation signal on the unlicensed carrier obtained by competition, the occupation signal carrying the triggered scheduling signaling for instructing to transmit the data with the UE on the unlicensed carrier obtained by competition.

In some embodiments, before transmitting the data with the UE according to the pre-scheduling signaling, the method further includes: sending a scheduling update signaling for updating the pre-scheduling signaling to the UE; and transmitting the data with the UE according to the pre-scheduling signaling includes: transmitting the data with the UE according to the pre-scheduling signaling and the scheduling update signaling.

In some embodiments, the scheduling update signaling for updating the pre-scheduling signaling is sent to the UE under at least one of the following conditions: after the pre-scheduling signaling is sent to the UE and before competing for the unlicensed carrier, acquiring uplink channel state information updated by the UE, and when a channel state change exceeds a pre-defined threshold, sending the scheduling update signaling to the UE; when the UE corresponding to the pre-scheduling signaling does not meet requirements for preempting the bandwidth of the unlicensed carrier, sending the scheduling update signaling to the UE; and when the UE corresponding to the pre-scheduling signaling has a new SR or the BSR is greater than a pre-set value, sending the scheduling update signaling to the UE.

In some embodiments, the scheduling update signaling includes at least one of the following: updated uplink channel grant information, updated subframe position instruction information, offset information of an MCS, and offset information of a PRB.

In some embodiments, sending the triggered scheduling signaling or the scheduling update signaling to the UE includes one of the following: when the unlicensed carrier obtained by competition is only used for a Frequency Division Duplex (FDD) mode, sending the triggered scheduling signaling or the scheduling update signaling to the UE on a licensed carrier, the FDD mode referring to that the unlicensed carrier is only used for uplink data transmission within an occupation period; and when the unlicensed carrier obtained by competition is only used for a Time Division Duplex (TDD) mode, sending the triggered scheduling signaling or the scheduling update signaling to the UE on a licensed carrier or a downlink subframe of the unlicensed carrier obtained by competition, the TDD mode referring to that the unlicensed carrier is used for both uplink data transmission and downlink data transmission within an occupation period.

In some embodiments, before transmitting the data with the UE according to the pre-scheduling signaling, the method further includes: sending, to the UE, a resource competition instruction for instructing the UE to compete for resources.

In some embodiments, the resource competition instruction is borne in at least one of the following ways: the pre-scheduling signaling, a Negative Acknowledgement (NACK) message, a paging message, a message 2 in random access, and a Downlink Control Information (DCI) resource competition signaling scrambled by a Radio Network Temporary Identity (RNTI).

According to another aspect of the embodiment of the present disclosure, a data transmission method is provided. The method includes: receiving a pre-scheduling signaling sent before a base station competes for an unlicensed carrier, the pre-scheduling signaling for instructing a UE to transmit data on an unlicensed resource obtained by competition; and transmitting the data with the base station according to the pre-scheduling signaling.

In some embodiments, transmitting the data with the base station according to the pre-scheduling signaling includes one of the following: when the base station obtains the unlicensed carrier by competition, receiving a triggered scheduling signaling, sent by the base station, for instructing to transmit the data with the UE; transmitting the data with the base station according to the pre-scheduling signaling and the triggered scheduling signaling; and when the UE obtains the unlicensed carrier by competition, transmitting the data with the base station according to the pre-scheduling signaling.

In some embodiments, before transmitting the data with the base station according to the pre-scheduling signaling, the method further includes: receiving a scheduling update signaling, sent by the base station, for updating the pre-scheduling signaling; and transmitting the data with the base station according to the pre-scheduling signaling includes: transmitting the data with the base station according to the pre-scheduling signaling and the scheduling update signaling.

In some embodiments, receiving the pre-scheduling signaling sent before the base station obtains the unlicensed carrier by competition includes one of the following: judging, according to whether a dedicated RNTI scrambling identifier exists in a received scheduling signaling, the scheduling signaling to be the pre-scheduling signaling or a normal scheduling signaling, and the pre-scheduling signaling carries the RNTI scrambling identifier, and the RNTI scrambling identifier does not exist in the normal scheduling signaling; and judging, according to a carrier index carried in a received scheduling signaling and whether a carrier corresponding to the carrier index is obtained by competition, the scheduling signaling to be the pre-scheduling signaling or a normal scheduling signaling, and the carrier index carried in the received scheduling signaling corresponds to an unlicensed carrier, when a notification that the base station has obtained resources by competition is not received or the UE does not obtain resources by competition, the scheduling signaling is the pre-scheduling signaling, and the scheduling signaling received after the base station competes for the resources is the normal signaling.

In some embodiments, transmitting the data with the base station according to the pre-scheduling signaling includes at least one of the following: when subframe position instruction information about data transmission does not exist in the pre-scheduling signaling and/or the scheduling update signaling, transmitting the data with the base station according to a subframe position determined by a pre-set rule, and the pre-set rule includes: determining the subframe position for transmitting the data with the base station by comparing a receiving time of the pre-scheduling signaling with a time of obtaining resource by competition; when subframe position instruction information for instructing a subframe position for transmitting the data with the base station exists in the pre-scheduling signaling and/or the scheduling update signaling, transmitting the data with the base station according to the subframe position instructed by the subframe position instruction information; and transmitting the data with the base station on a nearest uplink subframe after the UE obtains resources by competition.

In some embodiments, transmitting the data with the base station according to the subframe position determined by the pre-set rule includes at least one of the following: when a time interval between the time of the pre-scheduling signaling and the resource obtaining time by competition is smaller than a first pre-set threshold T1, transmitting the data with the base station on an uplink subframe nearest to a radio frame according to a timing relation obtained by adding a pre-set time length to the time of the pre-scheduling signaling; when a time interval between the time of the pre-scheduling signaling and the resource obtaining time by competition is greater than a first pre-set threshold T1 and smaller than a second pre-set threshold T2, transmitting the data with the base station on an uplink subframe nearest to a secured resource; and when a time interval between the time of the pre-scheduling signaling and the resource obtaining time by competition is greater than a second pre-set threshold T2, transmitting the data with the base station according to the scheduling update signaling.

In some embodiments, before transmitting the data with the base station according to the scheduling update signaling, the method further includes: competing for an unlicensed carrier according to the resource competition signaling sent by the base station and/or a pre-set resource competition manner.

In some embodiments, the pre-set resource competition manner includes at least one of the following: competing for an unlicensed carrier within a pre-set competition period, competing for an unlicensed carrier according to a corresponding relationship between an Identity (ID) of the UE and an unlicensed band, competing for an unlicensed carrier at a pre-set data transmission time of an uplink HARQ, and competing for an unlicensed carrier at a time that is ahead of a pre-set data transmission time of an uplink HARQ by a pre-set length.

According to one aspect of the embodiment of the present disclosure, a data transmission device is provided. The device includes: a first sending device, configured to send a pre-scheduling signaling to a UE before competing for an unlicensed carrier, the pre-scheduling signaling for instructing the UE to transmit data on an unlicensed resource obtained by competition; and a first transmission module, configured to transmit the data with the UE according to the pre-scheduling signaling.

In some embodiments, the pre-scheduling signaling includes at least one of the following information: carrier index of the unlicensed carrier, positions of PRBs allocated to the UE, the number of the PRBs, an MCS, subframe position index about data transmission of the UE on the unlicensed carrier, and a process number of an HARQ for data retransmission of the UE.

In some embodiments, the device further includes: a first determination module, configured to determine the UE to which the pre-scheduling signaling is sent according to at least one of the following information: an SR, a BSR, a service and service priority of a UE, and a geographic position of a UE.

In some embodiments, the first sending module is further configured to execute at least one of the following operations: sending the pre-scheduling signalings corresponding to multiple UEs to the multiple UEs on multiple subframes respectively; and sending the pre-scheduling signalings to the UEs according to a pre-set UE scheduling order.

In some embodiments, the first transmission module includes one of the following: a first transmission unit, configured to send, to the UE, a triggered scheduling signaling for instructing to transmit the data with the UE when a base station obtains the unlicensed carrier by competition, and transmit the data with the UE according to the pre-scheduling signaling and the triggered scheduling signaling; and a second transmission unit, configured to transmit the data with the UE according to the pre-scheduling signaling when the UE obtains the unlicensed carrier by competition.

In some embodiments, the first transmission unit is further configured to send, to the UE, the triggered scheduling signaling for instructing to transmit the data with the UE in at least one of the following ways: sending a pre-set sequence on a pre-set licensed carrier and/or a pre-set unlicensed carrier, the pre-set sequence including the triggered scheduling signaling for instructing to transmit the data with the UE on the unlicensed carrier obtained by competition; informing the UE through a physical signaling, the physical signaling including the triggered scheduling signaling for instructing to transmit the data with the UE on the unlicensed carrier obtained by competition; and sending an occupation signal on the unlicensed carrier obtained by competition, the occupation signal carrying the triggered scheduling signaling for instructing to transmit the data with the UE on the unlicensed carrier obtained by competition.

In some embodiments, the device further includes: a second sending module, configured to send, before transmitting the data with the UE according to the pre-scheduling signaling, a scheduling update signaling for updating the pre-scheduling signaling to the UE, and the first transmission module is further configured to transmit the data with the UE according to the pre-scheduling signaling and the scheduling update signaling.

In some embodiments, the second sending module is further configured to send the scheduling update signaling for updating the pre-scheduling signaling to the UE under at least one of the following conditions: after the pre-scheduling signaling is sent to the UE and before competing for the unlicensed carrier, acquiring uplink channel state information updated by the UE, and when a channel state change exceeds a pre-defined threshold, sending the scheduling update signaling to the UE; when the UE corresponding to the pre-scheduling signaling does not meet requirements for preempting the bandwidth of the unlicensed carrier, sending the scheduling update signaling to the UE; and when the UE corresponding to the pre-scheduling signaling has a new SR or the BSR is greater than a pre-set value, sending the scheduling update signaling to the UE.

In some embodiments, the scheduling update signaling includes at least one of the following: updated uplink channel grant information, updated subframe position instruction information, offset information of an MCS, and offset information of a PRB.

In some embodiments, the first transmission unit is further configured to send, when the unlicensed carrier obtained by competition is only used for an FDD mode, the triggered scheduling signaling to the UE on a licensed carrier, or send, when the unlicensed carrier obtained by competition is only used for a TDD mode, the triggered scheduling signaling to the UE on a licensed carrier or a downlink subframe of the unlicensed carrier obtained by competition; or the second sending module is further configured to send, when the unlicensed carrier obtained by competition is only used for an FDD mode, the scheduling update signaling to the UE on a licensed carrier, or send, when the unlicensed carrier obtained by competition is only used for a TDD mode, the scheduling update signaling to the UE on a licensed carrier or a downlink subframe of the unlicensed carrier obtained by competition, and the FDD mode refers to that the unlicensed carrier is only used for uplink data transmission within an occupation period, and the TDD mode refers to that the unlicensed carrier is used for both uplink data transmission and downlink data transmission within an occupation period.

In some embodiments, the device further includes: a third sending module, configured to send, to the UE, a resource competition instruction for instructing the UE to compete for resources.

In some embodiments, the resource competition instruction is borne in at least one of the following ways: the pre-scheduling signaling, an NACK message, a paging message, a message 2 in random access, and a DCI resource competition signaling scrambled by an RNTI.

According to another aspect of the embodiment of the present disclosure, a base station is provided. The base station includes the device as any one of the above.

According to one aspect of the embodiment of the present disclosure, a data transmission device is provided. The device includes: a first receiving module, configured to receive a pre-scheduling signaling sent before a base station competes for an unlicensed carrier, the pre-scheduling signaling for instructing a UE to transmit data on an unlicensed resource obtained by competition; and a second transmission module, configured to transmit the data with the base station according to the pre-scheduling signaling.

In some embodiments, the second transmission module includes one of the following: a third transmission unit, configured to receive, when the base station obtains the unlicensed carrier by competition, a triggered scheduling signaling, sent by the base station, for instructing to transmit the data with the UE, and transmit the data with the base station according to the pre-scheduling signaling and the triggered scheduling signaling; and a fourth transmission unit, configured to transmit, when the UE obtains the unlicensed carrier by competition, the data with the base station according to the pre-scheduling signaling.

In some embodiments, the device further includes: a second receiving module, configured to receive a scheduling update signaling, sent by the base station, for updating the pre-scheduling signaling before transmitting the data with the base station according to the pre-scheduling signaling, and the second transmission module is further configured to transmit the data with the base station according to the pre-scheduling signaling and the scheduling update signaling.

In some embodiments, the first receiving module includes one of the following: a first judgment unit, configured to judge, according to whether a dedicated RNTI scrambling identifier exists in a received scheduling signaling, the scheduling signaling to be the pre-scheduling signaling or a normal scheduling signaling, and the pre-scheduling signaling carries the RNTI scrambling identifier, and the RNTI scrambling identifier does not exist in the normal scheduling signaling; and a second judgment unit, configured to judge, according to a carrier index carried in a received scheduling signaling and whether a carrier corresponding to the carrier index is obtained by competition, the scheduling signaling to be the pre-scheduling signaling or a normal scheduling signaling, and the carrier index carried in the received scheduling signaling corresponds to an unlicensed carrier, when a notification that the base station has obtained resources by competition is not received or the UE does not obtain resources by competition, the scheduling signaling is the pre-scheduling signaling, and the scheduling signaling received after the base station competes for the resources is the normal signaling.

In some embodiments, the second transmission module includes at least one of the following: a fifth transmission unit, configured to transmit, when subframe position instruction information about data transmission does not exist in the pre-scheduling signaling and/or the scheduling update signaling, the data with the base station according to a subframe position determined by a pre-set rule, and the pre-set rule includes: determining the subframe position for transmitting the data with the base station by comparing a receiving time of the pre-scheduling signaling with a time of obtaining resource by competition; a sixth transmission unit, configured to transmit, when subframe position instruction information for instructing a subframe position for transmitting the data with the base station exists in the pre-scheduling signaling and/or the scheduling update signaling, the data with the base station according to the subframe position instructed by the subframe position instruction information; and a seventh transmission unit, configured to transmit the data with the base station on a nearest uplink subframe after the UE obtains resources by competition.

In some embodiments, the fifth transmission unit is further configured to transmit the data with the base station according to the subframe position determined by the pre-set rule in at least one of the following ways: when a time interval between the time of the pre-scheduling signaling and the resource obtaining time by competition is smaller than a first pre-set threshold T1, transmitting the data with the base station on an uplink subframe nearest to a radio frame according to a timing relation obtained by adding a pre-set time length to the time of the pre-scheduling signaling; when a time interval between the time of the pre-scheduling signaling and the resource obtaining time by competition is greater than a first pre-set threshold T1 and smaller than a second pre-set threshold T2, transmitting the data with the base station on an uplink subframe nearest to a secured resource; and when a time interval between the time of the pre-scheduling signaling and the resource obtaining time by competition is greater than a second pre-set threshold T2, transmitting the data with the base station according to the scheduling update signaling.

In some embodiments, the device further includes: a competition module, configured to compete, before transmitting the data with the base station according to the pre-scheduling signaling, for an unlicensed carrier according to the resource competition signaling sent by the base station and/or a pre-set resource competition manner.

In some embodiments, the pre-set resource competition manner includes at least one of the following: competing for an unlicensed carrier within a pre-set competition period, competing for an unlicensed carrier according to a corresponding relationship between an ID of the UE and an unlicensed band, competing for an unlicensed carrier at a pre-set data transmission time of an uplink HARQ, and competing for an unlicensed carrier at a time that is ahead of a pre-set data transmission time of an uplink HARQ by a pre-set length.

According to a further aspect of the embodiment of the present disclosure, a UE is provided. The UE includes the device as any one of the above.

By means of the embodiment of the present disclosure, a pre-scheduling signaling is sent to a UE before competing for an unlicensed carrier, the pre-scheduling signaling for instructing the UE to transmit data on an unlicensed resource obtained by competition; and the data is transmitted with the UE according to the pre-scheduling signaling. The problems in the related art of discontinuous data transmission and low resource utilization caused by resource competition and resource occupation time limitations when transmitting data by using an unlicensed carrier are solved, thereby transmitting the data by effectively utilizing limited occupation time on the unlicensed carrier, improving the spectrum efficiency, and reducing the data transmission delay of the unlicensed carrier.

BRIEF DESCRIPTION OF THE DRAWINGS

The drawings described herein are adopted to provide further understanding of the present disclosure, and form a part of the present application. The schematic embodiments and description of the present disclosure are adopted to explain the present disclosure, and do not form limits to the present disclosure.

DETAILED DESCRIPTION OF THE EMBODIMENTS

The present disclosure will be illustrated hereinbelow with reference to the drawings and in conjunction with the embodiments in detail. It is important to note that embodiments in the present application and features in the embodiments may be combined under the condition of no conflicts.

Figure 1:
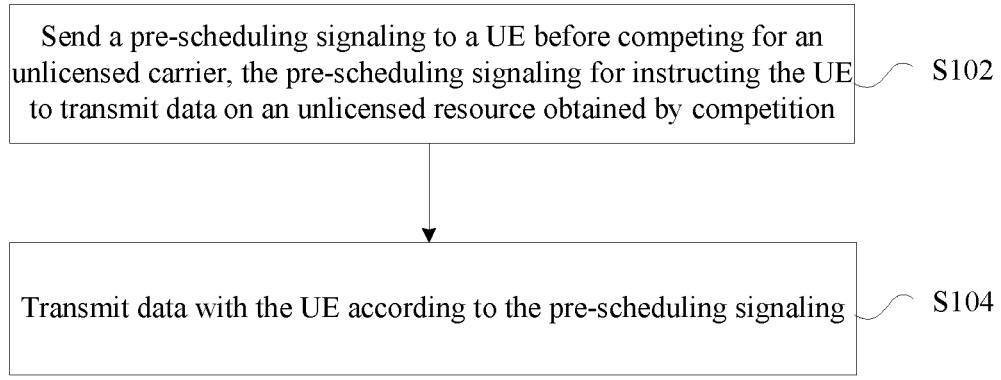
FIG. 1 is a flowchart of a data transmission method 1 according to an embodiment of the present disclosure.

A data transmission method is provided in the present embodiment. FIG. 1 is a flowchart of a data transmission method 1 according to an embodiment of the present disclosure. As shown in FIG. 1, the flow includes the steps S102 to S104.

At step S102, a pre-scheduling signaling is sent to a UE before competing for an unlicensed carrier, the pre-scheduling signaling for instructing the UE to transmit data on an unlicensed resource obtained by competition.

At step S104, the data is transmitted with the UE according to the pre-scheduling signaling.

By means of the above-mentioned steps, data is transmitted according to a pre-scheduling signaling sent to a UE before competing for an unlicensed carrier, the unlicensed carrier for data transmission is licensed in advance, and therefore the unlicensed carrier can be occupied in time to transmit the data. The problems in the related art of discontinuous data transmission and low resource utilization caused by resource competition and resource occupation time limitations when transmitting data by using an unlicensed carrier are solved, thereby transmitting the data by effectively utilizing limited occupation time on the unlicensed carrier, improving the spectrum efficiency, and reducing the data transmission delay of the unlicensed carrier.

Herein, the pre-scheduling signaling may include multiple signalings. For example, the pre-scheduling signaling may include at least one of the following information: carrier index of the unlicensed carrier, positions of PRBs allocated to the UE, the number of the PRBs, an MCS, subframe position index about data transmission of the UE on the unlicensed carrier, and a process number of an HARQ for data retransmission of the UE.

In some embodiments, before sending the pre-scheduling signaling to the UE, the UE to which the pre-scheduling signaling is sent may be determined according to at least one of the following information: an SR, a BSR, a service and service priority of a UE, and a geographic position of a UE. There may be multiple determined UEs to which the pre-scheduling signaling is sent, so, when the above-mentioned pre-scheduling signaling is sent to the multiple UEs, the following manners may be adopted. Namely, sending the pre-scheduling signaling to the UE before competing for the unlicensed carrier includes at least one of the following: sending the pre-scheduling signalings corresponding to the multiple UEs to the multiple UEs on multiple subframes respectively, that is, sending the pre-scheduling signalings corresponding to the multiple UEs to the multiple UEs on multiple subframes simultaneously; or, setting a pre-set UE scheduling order for the multiple UEs, and then sending the pre-scheduling signalings to the UEs according to the pre-set UE scheduling order.

In some embodiments, when the data is transmitted with the UE according to the pre-scheduling signaling, subjects capable of securing the unlicensed carrier may be different, and different processing manners are adopted. For example, transmitting the data with the UE according to the pre-scheduling signaling may include one of the following: when a base station obtains the unlicensed carrier by competition, sending, to the UE, a triggered scheduling signaling for instructing to transmit the data with the UE; transmitting the data with the UE according to the pre-scheduling signaling and the triggered scheduling signaling; and when the UE obtains the unlicensed carrier by competition, transmitting the data with the UE according to the pre-scheduling signaling.

Herein, when the above-mentioned triggered scheduling signaling is sent to the UE, multiple manners may be adopted. For example, the triggered scheduling signaling for instructing to transmit the data with the UE may be sent to the UE in at least one of the following ways: sending a pre-set sequence on a pre-set licensed carrier and/or a pre-set unlicensed carrier, the pre-set sequence including the triggered scheduling signaling for instructing to transmit the data with the UE on the unlicensed carrier obtained by competition; informing the UE through a physical signaling, the physical signaling including the triggered scheduling signaling for instructing to transmit the data with the UE on the unlicensed carrier obtained by competition; and sending an occupation signal on the unlicensed carrier obtained by competition, the occupation signal carrying the triggered scheduling signaling for instructing to transmit the data with the UE on the unlicensed carrier obtained by competition.

The unlicensed carrier for use is continuously changing, so when the unlicensed carrier changes, it is necessary to send update information of the changing unlicensed carrier to the UE. That is, before transmitting the data with the UE according to the pre-scheduling signaling, a scheduling update signaling for updating the pre-scheduling signaling may be sent to the UE; and then, when transmitting the data with the UE according to the pre-scheduling signaling, the data is transmitted with the UE according to the pre-scheduling signaling and the scheduling update signaling.

It is important to note that the unlicensed carrier probably changes under multiple conditions. For example, the scheduling update signaling for updating the pre-scheduling signaling may be sent to the UE under at least one of the following conditions: after the pre-scheduling signaling is sent to the UE and before competing for the unlicensed carrier, acquiring uplink channel state information updated by the UE, and when a channel state change exceeds a pre-defined threshold, sending the scheduling update signaling to the UE; when the UE corresponding to the pre-scheduling signaling does not meet requirements for pre-empting the bandwidth of the unlicensed carrier, sending the scheduling update signaling to the UE; and when the UE corresponding to the pre-scheduling signaling has a new SR or the BSR is greater than a pre-set value, sending the scheduling update signaling to the UE.

Herein, the above-mentioned scheduling update signaling may include multiple pieces of information. For example, the above-mentioned scheduling update signaling may include at least one of the following: updated uplink channel grant information, updated subframe position instruction information, offset information of an MCS, and offset information of a PRB.

In some embodiments, when sending the triggered scheduling signaling or the scheduling update signaling to the UE, multiple manners may be adopted. For example, one of the following manners may be adopted: when the unlicensed carrier obtained by competition is only used for an FDD mode, sending the triggered scheduling signaling or the scheduling update signaling to the UE on a licensed carrier, the FDD mode referring to that the unlicensed carrier is only used for uplink data transmission within an occupation period; and when the unlicensed carrier obtained by competition is only used for a TDD mode, sending the triggered scheduling signaling or the scheduling update signaling to the UE on a licensed carrier or a downlink subframe of the unlicensed carrier obtained by competition, the TDD mode referring to that the unlicensed carrier is used for both uplink data transmission and downlink data transmission within an occupation period.

In some embodiments, before transmitting the data with the UE according to the pre-scheduling signaling, a resource competition instruction for instructing the UE to compete for resources may also be sent to the UE, where the above-mentioned resource competition instruction is borne in at least one of the following ways: the pre-scheduling signaling, an NACK message, a paging message, a message 2 in random access, and a DCI resource competition signaling scrambled by an RNTI.

Figure 2:
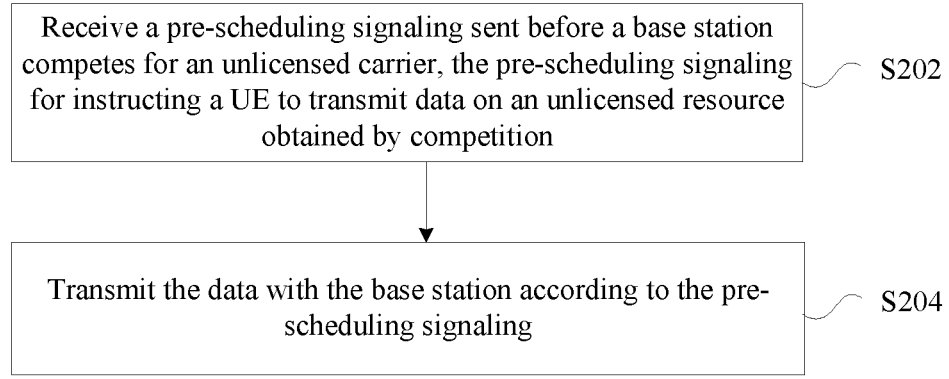
FIG. 2 is a flowchart of a data transmission method 2 according to an embodiment of the present disclosure.

FIG. 2 is a flowchart of a data transmission method 2 according to an embodiment of the present disclosure. As shown in FIG. 2, the flow includes the steps S202 to S204.

At step S202, a pre-scheduling signaling sent before a base station competes for an unlicensed carrier is received, the pre-scheduling signaling for instructing a UE to transmit data on an unlicensed resource obtained by competition.

At step S204, the data is transmitted with the base station according to the pre-scheduling signaling.

By means of the above-mentioned steps, data is transmitted according to a pre-scheduling signaling sent to a UE before a base station competes for an unlicensed carrier, that is, the base station licenses the unlicensed carrier for data transmission in advance, and therefore the unlicensed carrier can be occupied in time to transmit the data. The problems in the related art of discontinuous data transmission and low resource utilization caused by resource competition and resource occupation time limitations when transmitting data by using an unlicensed carrier are solved, thereby transmitting the data by effectively utilizing limited occupation time on the unlicensed carrier, improving the spectrum efficiency, and reducing the data transmission delay of the unlicensed carrier.

When the data is transmitted with the base station according to the pre-scheduling signaling, different processing manners are adopted according to different subjects capable of securing the unlicensed carrier. For example, when the base station obtains the unlicensed carrier by competition, a triggered scheduling signaling, sent by the base station, for instructing to transmit the data with the UE is received, and the data is transmitted with the base station according to the pre-scheduling signaling and the triggered scheduling signaling. For another example, when the UE obtains the unlicensed carrier by competition, the data is transmitted with the base station according to the pre-scheduling signaling.

The unlicensed carrier for use is continuously changing, so before transmitting the data with the base station according to the pre-scheduling signaling, a scheduling update signaling, sent by the base station, for updating the pre-scheduling signaling is also received. Therefore, when transmitting the data with the base station according to the pre-scheduling signaling, the data is transmitted with the base station according to the pre-scheduling signaling and the scheduling update signaling.

It is important to note that receiving the pre-scheduling signaling sent before the base station obtains the unlicensed carrier by competition also includes the following processing: judging, according to whether a dedicated RNTI scrambling identifier exists in a received scheduling signaling, the scheduling signaling to be the pre-scheduling signaling or a normal scheduling signaling, and the pre-scheduling signaling carries the RNTI scrambling identifier, and the RNTI scrambling identifier does not exist in the normal scheduling signaling; and judging, according to a carrier index carried in a received scheduling signaling and whether a carrier corresponding to the carrier index is obtained by competition, the scheduling signaling to be the pre-scheduling signaling or a normal scheduling signaling, and the carrier index carried in the received scheduling signaling corresponds to an unlicensed carrier, when a notification that the base station has obtained resources by competition is not received or the UE does not obtain resources by competition, the scheduling signaling is the pre-scheduling signaling, and the scheduling signaling received after the base station competes for the resources is the normal signaling.

When transmitting the data with the base station according to the pre-scheduling signaling, different transmission processing manners are adopted according to different specific transmission scenarios. For example, when subframe position instruction information about data transmission does not exist in the pre-scheduling signaling and/or the scheduling update signaling, the data is transmitted with the base station according to a subframe position determined by a pre-set rule, and the pre-set rule includes: determining the subframe position for transmitting the data with the base station by comparing a receiving time of the pre-scheduling signaling with a time of obtaining resource by competition. For example, when subframe position instruction information for instructing a subframe position for transmitting the data with the base station exists in the pre-scheduling signaling and/or the scheduling update signaling, the data is transmitted with the base station according to the subframe position instructed by the subframe position instruction information. For another example, the data may be transmitted with the base station on a nearest uplink subframe after the UE obtains resources by competition.

Herein, when transmitting the data with the base station according to the subframe position determined by the pre-set rule, multiple processing manners may be adopted. For example, transmitting the data with the base station according to the subframe position determined by the pre-set rule includes at least one of the following: when a time interval between the time of the pre-scheduling signaling and the resource obtaining time by competition is smaller than a first pre-set threshold T1, transmitting the data with the base station on an uplink subframe nearest to a radio frame according to a timing relation obtained by adding a pre-set time length to the time of the pre-scheduling signaling; when a time interval between the time of the pre-scheduling signaling and the resource obtaining time by competition is greater than a first pre-set threshold T1 and smaller than a second pre-set threshold T2, transmitting the data with the base station on an uplink subframe nearest to a secured resource; and when a time interval between the time of the pre-scheduling signaling and the resource obtaining time by competition is greater than a second pre-set threshold T2, transmitting the data with the base station according to the scheduling update signaling.

In some embodiments, before transmitting the data with the base station according to the scheduling update signaling, it may compete for an unlicensed carrier according to the resource competition signaling sent by the base station and/or a pre-set resource competition manner.

Herein, the above-mentioned pre-set resource competition manner may include at least one of the following: competing for an unlicensed carrier within a pre-set competition period, competing for an unlicensed carrier according to a corresponding relationship between an ID of the UE and an unlicensed band, competing for an unlicensed carrier at a pre-set data transmission time of an uplink HARQ, and competing for an unlicensed carrier at a time that is ahead of a pre-set data transmission time of an uplink HARQ by a pre-set length.

In the present embodiment, a data transmission device is also provided. The device is used for implementing the above-mentioned embodiment and a preferred implementation manner. Those which have been illustrated will not be elaborated herein. Just as a term 'module' used below, the combination of software and/or hardware with pre-set functions may be implemented. Although the device described in the following embodiment is better implemented by software, the implementation of hardware or the combination of software and hardware may be possible and conceived.

Figure 3:
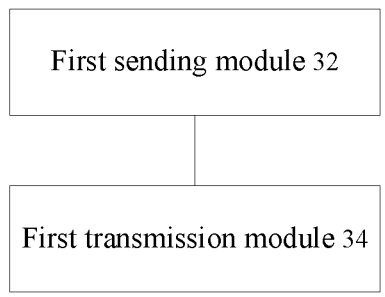
FIG. 3 is a block diagram of a data transmission device 1 according to an embodiment of the present disclosure.

FIG. 3 is a block diagram of a data transmission device 1 according to an embodiment of the present disclosure. As shown in FIG. 3, the device includes: a first sending module 32 and a first transmission module 34. The device will be illustrated below.

The first sending module 32 is configured to send a pre-scheduling signaling to a UE before competing for an unlicensed carrier, the pre-scheduling signaling for instructing the UE to transmit data on an unlicensed resource obtained by competition; and the first transmission module 34 is connected to the first sending module 32 and is configured to transmit the data with the UE according to the pre-scheduling signaling.

In some embodiments, the pre-scheduling signaling may include at least one of the following information: carrier index of the unlicensed carrier, positions of PRBs allocated to the UE, the number of the PRBs, an MCS, subframe position index about data transmission of the UE on the unlicensed carrier, and a process number of an HARQ for data retransmission of the UE.

Figure 4:
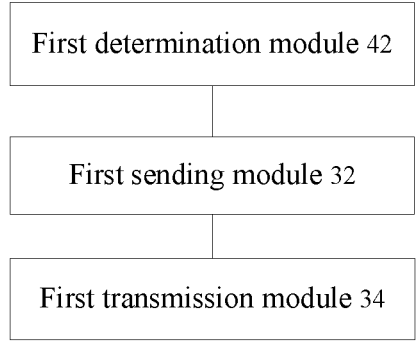
FIG. 4 is an exemplary block diagram 1 of a data transmission device 1 according to an embodiment of the present disclosure.

FIG. 4 is an exemplary block diagram 1 of a data transmission device 1 according to an embodiment of the present disclosure. As shown in FIG. 4, the device further includes, in addition to all structures shown in FIG. 3, a first determination module 42. The first determination module 42 will be illustrated below.

The first determination module 42 is connected to the first sending module 32, and is configured to determine the UE to which the pre-scheduling signaling is sent according to at least one of the following information: an SR, a BSR, a service and service priority of a UE, and a geographic position of a UE.

In some embodiments, the first sending module 32 is further configured to execute at least one of the following operations: sending the pre-scheduling signalings corresponding to multiple UEs to the multiple UEs on multiple subframes respectively; and sending the pre-scheduling signalings to the UEs according to a pre-set UE scheduling order.

Figure 5:
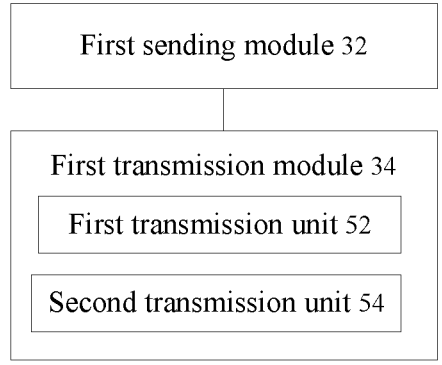
FIG. 5 is an exemplary block diagram of a first transmission module 34 in a data transmission device 1 according to an embodiment of the present disclosure.

FIG. 5 is an exemplary block diagram of a first transmission module 34 in a data transmission device 1 according to an embodiment of the present disclosure. As shown in FIG. 5, the first transmission module 34 includes one of the following: a first transmission unit 52 and a second transmission unit 54. The first transmission module 34 will be illustrated below.

The first transmission unit 52 is configured to send, to the UE, a triggered scheduling signaling for instructing to transmit the data with the UE when a base station obtains the unlicensed carrier by competition, and transmit the data with the UE according to the pre-scheduling signaling and the triggered scheduling signaling; and the second transmission unit 54 is configured to transmit the data with the UE according to the pre-scheduling signaling when the UE obtains the unlicensed carrier by competition.

In some embodiments, the first transmission unit 52 is further configured to send, to the UE, the triggered scheduling signaling for instructing to transmit the data with the UE in at least one of the following ways: sending a pre-set sequence on a pre-set licensed carrier and/or a pre-set unlicensed carrier, the pre-set sequence including the triggered scheduling signaling for instructing to transmit the data with the UE on the unlicensed carrier obtained by competition; informing the UE through a physical signaling, the physical signaling including the triggered scheduling signaling for instructing to transmit the data with the UE on the unlicensed carrier obtained by competition; and sending an occupation signal on the unlicensed carrier obtained by competition, the occupation signal carrying the triggered scheduling signaling for instructing to transmit the data with the UE on the unlicensed carrier obtained by competition.

Figure 6:
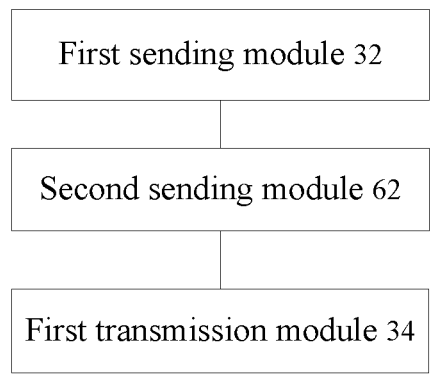
FIG. 6 is an exemplary block diagram 2 of a data transmission device 1 according to an embodiment of the present disclosure.

FIG. 6 is an exemplary block diagram 2 of a data transmission device 1 according to an embodiment of the present disclosure. As shown in FIG. 6, the device further includes, in addition to all structures shown in FIG. 3, a second sending module 62. The second sending module 62 will be illustrated below.

The second sending module 62 is connected to the first sending module 32 and the first transmission module 34, and is configured to send, before transmitting the data with the UE according to the pre-scheduling signaling, a scheduling update signaling for updating the pre-scheduling signaling to the UE. The first transmission module 34 is further configured to transmit the data with the UE according to the pre-scheduling signaling and the scheduling update signaling.

In some embodiments, the second sending module 62 is further configured to send the scheduling update signaling for updating the pre-scheduling signaling to the UE under at least one of the following conditions: after the pre-scheduling signaling is sent to the UE and before competing for the unlicensed carrier, acquiring uplink channel state information updated by the UE, and when a channel state change exceeds a pre-defined threshold, sending the scheduling update signaling to the UE; when the UE corresponding to the pre-scheduling signaling does not meet requirements for preempting the bandwidth of the unlicensed carrier, sending the scheduling update signaling to the UE; and when the UE corresponding to the pre-scheduling signaling has a new SR or the BSR is greater than a pre-set value, sending the scheduling update signaling to the UE.

In some embodiments, the scheduling update signaling includes at least one of the following: updated uplink channel grant information, updated subframe position instruction information, offset information of an MCS, and offset information of a PRB.

In some embodiments, the first transmission unit 52 is further configured to send, when the unlicensed carrier obtained by competition is only used for an FDD mode, the triggered scheduling signaling to the UE on a licensed carrier, or send, when the unlicensed carrier obtained by competition is only used for a TDD mode, the triggered scheduling signaling to the UE on a licensed carrier or a downlink subframe of the unlicensed carrier obtained by competition; or the second sending module 62 is further configured to send, when the unlicensed carrier obtained by competition is only used for an FDD mode, the scheduling update signaling to the UE on a licensed carrier, or send, when the unlicensed carrier obtained by competition is only used for a TDD mode, the scheduling update signaling to the UE on a licensed carrier or a downlink subframe of the unlicensed carrier obtained by competition, and the FDD mode refers to that the unlicensed carrier is only used for uplink data transmission within an occupation period, and the TDD mode refers to that the unlicensed carrier is used for both uplink data transmission and downlink data transmission within an occupation period.

Figure 7:
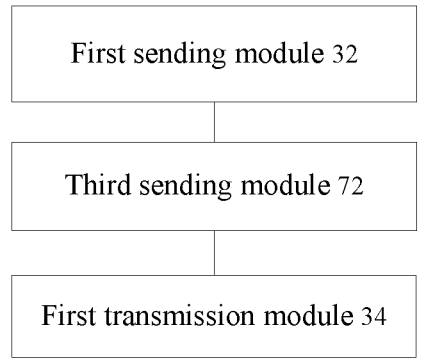
FIG. 7 is an exemplary block diagram 3 of a data transmission device 1 according to an embodiment of the present disclosure.

FIG. 7 is an exemplary block diagram 3 of a data transmission device 1 according to an embodiment of the present disclosure. As shown in FIG. 7, the device further includes, in addition to all structures shown in FIG. 3, a third sending module 72. The third sending module 72 will be illustrated below.

The third sending module 72 is connected to the first sending module 32 and the first transmission module 34, and is configured to send, to the UE, a resource competition instruction for instructing the UE to compete for resources.

In some embodiments, the resource competition instruction is borne in at least one of the following ways: the pre-scheduling signaling, an NACK message, a paging message, a message 2 in random access, and a DCI resource competition signaling scrambled by an RNTI.

Figure 8:
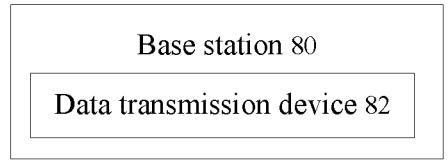
FIG. 8 is a block diagram of a base station according to an embodiment of the present disclosure.

FIG. 8 is a block diagram of a base station according to an embodiment of the present disclosure. As shown in FIG. 8, the base station 80 includes a data transmission device 182 as any one of the above.

Figure 9:
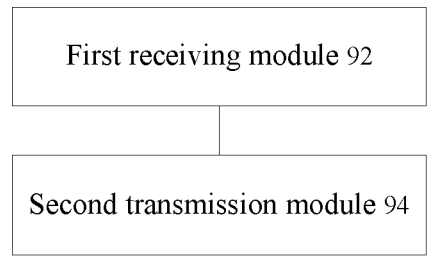
FIG. 9 is a block diagram of a data transmission device 2 according to an embodiment of the present disclosure.

FIG. 9 is a block diagram of a data transmission device 2 according to an embodiment of the present disclosure. As shown in FIG. 9, the device includes: a first receiving module 92 and a second transmission module 94. The device will be illustrated below.

The first receiving module 92 is configured to receive a pre-scheduling signaling sent before a base station competes for an unlicensed carrier, the pre-scheduling signaling for instructing a UE to transmit data on an unlicensed resource obtained by competition; and the second transmission module 94 is connected to the first receiving module 92, and is configured to transmit the data with the base station according to the pre-scheduling signaling.

Figure 10:
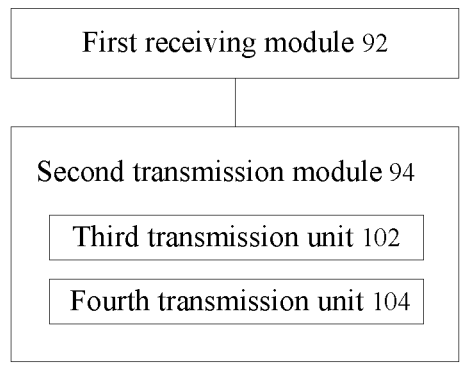
FIG. 10 is an exemplary block diagram 1 of a second transmission module 94 in a data transmission device 2 according to an embodiment of the present disclosure.

FIG. 10 is an exemplary block diagram 1 of a second transmission module 94 in a data transmission device 2 according to an embodiment of the present disclosure. As shown in FIG. 10, the second transmission module 94 includes one of the following: a third transmission unit 102 and a fourth transmission unit 104. The second transmission module 94 will be illustrated below.

The third transmission unit 102 is configured to receive, when the base station obtains the unlicensed carrier by competition, a triggered scheduling signaling, sent by the base station, for instructing to transmit the data with the UE, and transmit the data with the base station according to the pre-scheduling signaling and the triggered scheduling signaling; and the fourth transmission unit 104 is configured to transmit, when the UE obtains the unlicensed carrier by competition, the data with the base station according to the pre-scheduling signaling.

Figure 11:
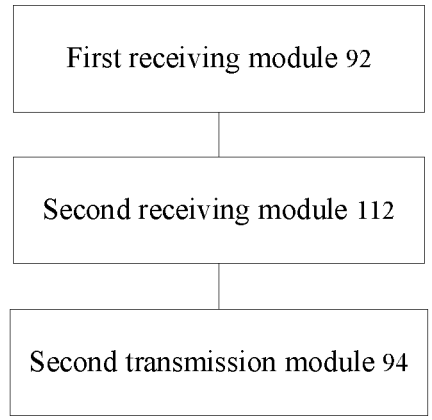
FIG. 11 is an exemplary block diagram 1 of a data transmission device 2 according to an embodiment of the present disclosure.

FIG. 11 is an exemplary block diagram 1 of a data transmission device 2 according to an embodiment of the present disclosure. As shown in FIG. 11, the device further includes, in addition to all structures shown in FIG. 9, a second receiving module 112. The second receiving module 112 will be illustrated below.

The second receiving module 112 is connected to the first receiving module 92 and the second transmission module 94, and is configured to receive a scheduling update signaling, sent by the base station, for updating the pre-scheduling signaling before transmitting the data with the base station according to the pre-scheduling signaling. The second transmission module 94 is further configured to transmit the data with the base station according to the pre-scheduling signaling and the scheduling update signaling.

Figure 12:
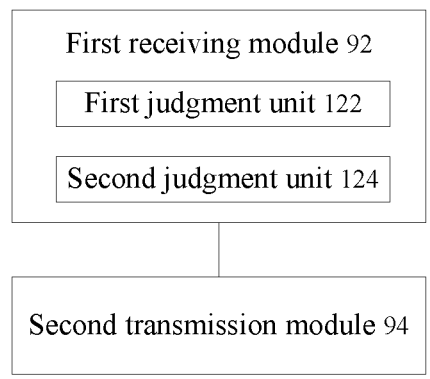
FIG. 12 is an exemplary block diagram of a first receiving module 92 in a data transmission device 2 according to an embodiment of the present disclosure.

FIG. 12 is an exemplary block diagram of a first receiving module 92 in a data transmission device 2 according to an embodiment of the present disclosure. As shown in FIG. 12, the first receiving module 92 includes one of the following: a first judgment unit 122 and a second judgment unit 124. The first receiving module 92 will be illustrated below.

The first judgment unit 122 is configured to judge, according to whether a dedicated RNTI scrambling identifier exists in a received scheduling signaling, the scheduling signaling to be the pre-scheduling signaling or a normal scheduling signaling, and the pre-scheduling signaling carries the RNTI scrambling identifier, and the RNTI scrambling identifier does not exist in the normal scheduling signaling; and the second judgment unit 124 is configured to judge, according to a carrier index carried in a received scheduling signaling and whether a carrier corresponding to the carrier index is obtained by competition, the scheduling signaling to be the pre-scheduling signaling or a normal scheduling signaling, and the carrier index carried in the received scheduling signaling corresponds to an unlicensed carrier, when a notification that the base station has obtained resources by competition is not received or the UE does not obtain resources by competition, the scheduling signaling is the pre-scheduling signaling, and the scheduling signaling received after the base station competes for the resources is the normal signaling.

Figure 13:
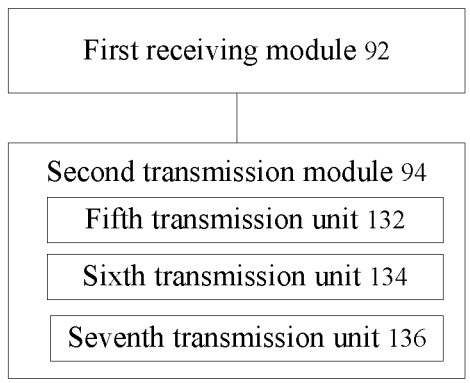
FIG. 13 is an exemplary block diagram 2 of a second transmission module 94 in a data transmission device 2 according to an embodiment of the present disclosure.

FIG. 13 is an exemplary block diagram 2 of a second transmission module 94 in a data transmission device 2 according to an embodiment of the present disclosure. As shown in FIG. 13, the second transmission module 94 includes one of the following: a fifth judgment unit 132, a sixth transmission unit 134 and a seven judgment unit 136. The second transmission module 94 will be illustrated below.

The fifth transmission unit 132 is configured to transmit, when subframe position instruction information about data transmission does not exist in the pre-scheduling signaling and/or the scheduling update signaling, the data with the base station according to a subframe position determined by a pre-set rule, and the pre-set rule includes: determining the subframe position for transmitting the data with the base station by comparing a receiving time of the pre-scheduling signaling with a time of obtaining resource by competition; the sixth transmission unit 134 is configured to transmit, when subframe position instruction information for instructing a subframe position for transmitting the data with the base station exists in the pre-scheduling signaling and/or the scheduling update signaling, the data with the base station according to the subframe position instructed by the subframe position instruction information; and the seventh transmission unit 136 is configured to transmit the data with the base station on a nearest uplink subframe after the UE obtains resources by competition.

In some embodiments, the fifth transmission unit 132 is further configured to transmit the data with the base station according to the subframe position determined by the pre-set rule in at least one of the following ways: when a time interval between the time of the pre-scheduling signaling and the resource obtaining time by competition is smaller than a first pre-set threshold T1, transmitting the data with the base station on an uplink subframe nearest to a radio frame according to a timing relation obtained by adding a pre-set time length to the time of the pre-scheduling signaling; when a time interval between the time of the pre-scheduling signaling and the resource obtaining time by competition is greater than a first pre-set threshold T1 and smaller than a second pre-set threshold T2, transmitting the data with the base station on an uplink subframe nearest to a secured resource; and when a time interval between the time of the pre-scheduling signaling and the resource obtaining time by competition is greater than a second pre-set threshold T2, transmitting the data with the base station according to the scheduling update signaling.

Figure 14:
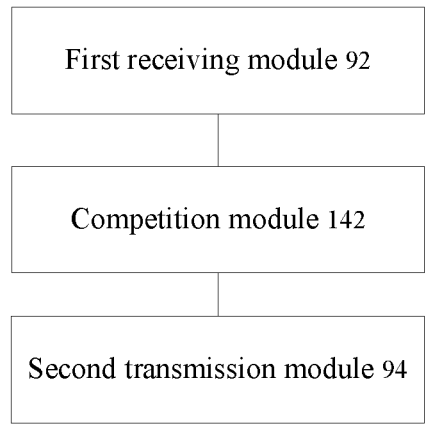
FIG. 14 is an exemplary block diagram 2 of a data transmission device 2 according to an embodiment of the present disclosure.

FIG. 14 is an exemplary block diagram 2 of a data transmission device 2 according to an embodiment of the present disclosure. As shown in FIG. 14, the device further includes, in addition to all structures shown in FIG. 9, a competition module 142. The competition module 142 will be illustrated below.

The competition module 142 is connected to the first receiving module 92 and the second transmission module 94, and is configured to compete, before transmitting the data with the base station according to the pre-scheduling signaling, for an unlicensed carrier according to the resource competition signaling sent by the base station and/or a pre-set resource competition manner.

In some embodiments, the pre-set resource competition manner includes at least one of the following: competing for an unlicensed carrier within a pre-set competition period, competing for an unlicensed carrier according to a corresponding relationship between an ID of the UE and an unlicensed band, competing for an unlicensed carrier at a pre-set data transmission time of an uplink HARQ, and competing for an unlicensed carrier at a time that is ahead of a pre-set data transmission time of an uplink HARQ by a pre-set length.

Figure 15:
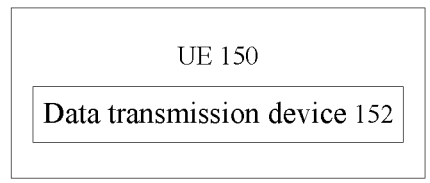
FIG. 15 is a block diagram of a UE according to an embodiment of the present disclosure.

FIG. 15 is a block diagram of a UE according to an embodiment of the present disclosure. As shown in FIG. 15, the UE 150 includes a data transmission device 2 152 as any one of the above.

In order to solve the above-mentioned problems in the related art, an unlicensed resource data scheduling and transmission method provided on the basis of the above-mentioned embodiments and exemplary embodiments will be illustrated below on the basis of a base station side and a terminal side respectively.

The unlicensed resource data scheduling and transmission method is applied to the base station side, and includes: a base station sends a pre-scheduling signaling before securing an unlicensed resource, and sends a triggered scheduling signaling and/or a scheduling update signaling to a UE after securing the resource; and the base station receives uplink data according to the pre-scheduling signaling and/or the scheduling update signaling.

Herein, the pre-scheduling signaling is used to give, to the UE, an instruction of a method for transmitting data on the unlicensed resource obtained by competition, and includes at least one of the following: a carrier index instruction, positions of allocated PRBs, the number of the PRBs, an MCS, a subframe position instruction, and a process number of an HARQ.

Herein, subframe position instruction information gives, to the UE, an instruction of a subframe index where uplink data undergoes unlicensed transmission, and is given by means of a subframe offset relative to time N or M, or by means of a subframe bitmap manner, where N is a securing time of an unlicensed resource, and M is a sending time of a pre-scheduling instruction.

Before sending the pre-scheduling signaling, the base station may determine specific UEs to which pre-scheduling signalings are sent and a subframe position for transmission of each UE according to a system resource, a received SR and/or BSR or determined data of the UE and a service priority (delay and Qos) and a geographic position of the UE.

The base station may send pre-scheduling signalings to multiple UEs on multiple subframes. Or, the base station arranges pre-scheduled UEs in a scheduling order to form a scheduling queue, and the base station sequentially sends pre-scheduling signalings to the UEs according to an order of the UEs in the queue.

After securing the resource, the base station may send a triggered scheduling signaling to the UE by means of one of the following manners.

Manner 1: The base station sends a pre-defined sequence at a pre-defined licensed or unlicensed position, and the sequence may be one of the following: a Primary Synchronization Signal (PSS)/Secondary Synchronization Signal (SSS), a preamble, and a reference signal. Different cells have different sequences.

Manner 2: The base station informs the UE through a physical signaling, and the physical signaling may include a DCI signaling.

Manner 3: The base station sends an occupation signal on the unlicensed carrier obtained by competition, and the signal is associated with a cell ID in a one-to-one correspondence manner.

It is important to note that the scheduling update information may be sent under the following conditions: when the base station obtains new uplink channel state information after sending the pre-scheduling signaling and before preempting the resource, the base station sends the scheduling update information after preempting the resource; when the pre-scheduled UE cannot achieve a bandwidth in a control requirement, the base station sends scheduling update supplementary information to other UEs after preempting the resource; and when the scheduled UE has a new SR or a BSR is larger, the base station sends the scheduling update information after preempting the resource.

Herein, the scheduling update information may include multiple pieces of information. For example, the scheduling update information may include one or more of a new UL grant, subframe instruction information or offset information of an MCS and a PRB.

The unlicensed resource obtained by competition is only used for uplink data transmission within an occupation period, that is, a frame structure only includes an uplink subframe. Or, the unlicensed resource obtained by competition is used for both uplink data transmission and downlink data transmission, that is, a frame structure adopts a TDD manner, where TDD uplink/downlink subframe configurations are determined according to a resource securing subject, a time of obtaining resource by competition and an uplink/downlink service volume.

When the UE secures a resource and the unlicensed carrier is only used for an FDD mode, the subframe transmission instruction information and/or the scheduling update signaling are/is sent on a licensed carrier. When the unlicensed carrier is a TDD mode, the subframe transmission instruction information and/or the scheduling update signaling are/is sent on a licensed carrier or a downlink subframe of the unlicensed carrier obtained by competition.

In addition to competing for the resource, the base station may also select one or more subordinate UEs to compete, and send a resource competition signaling to the UE.

Herein, the pre-scheduling signaling and the resource preempting signaling are sent simultaneously, or the resource preempting signaling is sent before the pre-scheduling signaling according to a pre-defined timing relation.

When the two signalings are sent simultaneously, the UE learns of necessity for resource competition through a carrier index.

In addition, the resource preempting signaling may be borne by means of multiple manners. For example, the resource preempting signaling may be borne by means of the above-mentioned pre-scheduling signaling, or an NACK information instruction, or a paging message, or an msg2, or may be instructed by defining a DCI resource preempting signaling scrambled by a dedicated RNTI.

The unlicensed resource data scheduling and transmission method is applied to the terminal side, and includes the processing as follows.

A terminal receives a resource preempting signaling and/or a pre-scheduling signaling and/or a scheduling update signaling, preempts a resource according to the resource preempting signaling and/or the pre-scheduling signaling, and sends a corresponding physical channel or signal according to the pre-scheduling signaling and/or the scheduling update signaling.

It is important to note that a UE may judge to be pre-scheduled or normally scheduled by means of an RNTI scrambling identifier, and the UE may also judge a scheduling signaling to be a pre-scheduling signaling or a normal scheduling signaling by means of a carrier index in the scheduling signaling and a manner of indicating whether the resource has been secured.

When the carrier index is an unlicensed carrier or a transmission instruction sent after a base station competes for a resource is not received or the base station does not secure the resource, the scheduling signaling is the pre-scheduling signaling. The scheduling signaling received after the resource is obtained by competition is the normal scheduling signaling.

When the scheduling signaling is judged to be the pre-scheduling signaling, the UE needs to wait for a triggered scheduling signaling to be sent by the base station, or only when the UE secures the resource, uplink data transmission can be performed. When the scheduling signaling is the normal scheduling signaling, the UE performs uplink data transmission on an N+K subframe, where N is a subframe of the normal scheduling signaling, and K is smaller than or equal to 4.

Herein, the UE may determine a subframe position for data transmission by means of the following methods.

Method 1: Subframe instruction information does not exist in the pre-scheduling signaling and/or the scheduling update signaling, and the UE judges a subframe position according to a pre-fined rule, and the pre-defined rule includes: comparing, by the UE, the time of the pre-scheduling signaling with a time of obtaining resource by competition, and judging a position for transmitting an uplink subframe.

When a time interval between the time of the pre-scheduling signaling and the resource obtaining time by competition is smaller than a pre-defined threshold T1, T1 being smaller than 4 ms, the UE sends data on an uplink subframe nearest to a radio frame according to a timing relation obtained by adding 4 to the time of the pre-scheduling signaling.

When a time interval between the time of the pre-scheduling signaling and the resource obtaining time by competition is greater than a pre-defined threshold T1 and smaller than a pre-defined threshold T2, T1 being smaller than 1s, the UE transmits data on an uplink subframe nearest to a secured resource.

When a time interval between the time of the pre-scheduling signaling and the resource obtaining time by competition is greater than a pre-defined threshold T2, the UE performs uplink data transmission according to a scheduling supplementary signaling or update signaling sent by the base station.

The UE directly sends data on an uplink subframe nearest to the secured resource without comparison.

Method 2: The UE sends an uplink subframe at a corresponding subframe position according to the pre-scheduling signaling and/or new scheduling update instruction information.

Herein, when the UE participates in competition, the UE also makes a competition according to a pre-defined manner in addition to competing for a resource according to a competition instruction signaling sent by the base station, where the pre-defined manner is determined according to a corresponding relationship between a pre-defined period and/or a UE ID and an unlicensed band. In addition, the UE may start to compete at a data transmission time or a time k ahead of same (k<1 ms) according to a timing relation of an LTE uplink HARQ. For example, if the base station sends the pre-scheduling signaling at a time M, the UE starts to compete for the resource at M+4+10*N, M+7+10*N, M+6+10*N, and M+4*N, where N is an integer greater than or equal to 0. Or resource competition starts ahead of the above-mentioned time by certain time values, e.g., 0.5 ms.

By means of the above-mentioned unlicensed resource data scheduling and transmission method, the specific relevant problems of discontinuous data transmission caused by competition needed by sending of uplink data and occupation time limitations when an LTE system operates at an unlicensed carrier band are solved, thereby enabling the LTE system to transmit the data by effectively utilizing limited occupation time on the unlicensed carrier, improving the spectrum efficiency, and reducing the data transmission delay of the uplink unlicensed carrier.

The unlicensed carrier uplink data scheduling and transmission method provided in the embodiment of the present disclosure will be illustrated below with reference to the drawings and specific embodiments.

Figure 16:
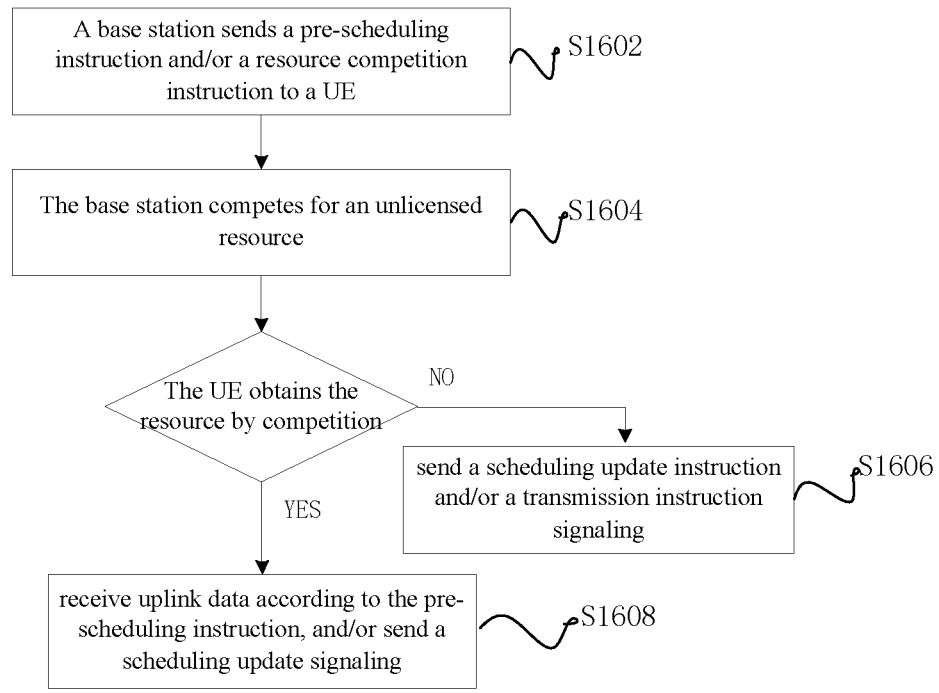
FIG. 16 is a flowchart of description of an unlicensed uplink data processing process from a base station side according to an embodiment of the present disclosure.

FIG. 16 is a flowchart of description of an unlicensed uplink data processing process from a base station side according to an embodiment of the present disclosure. As shown in FIG. 16, the flow includes the steps S1602 to S1608.

At step S1602, a base station sends a pre-scheduling instruction signaling and/or a resource preempting signaling.

In some embodiments, the pre-scheduling signaling is sent before the base station or a UE subordinate to the base station competes for a resource.

The pre-scheduling signaling may include at least one of the following: a carrier index, allocated PRBs, an MCS, a subframe index or a subframe offset relative to time N or M, and a position of CCA, where N is a securing time of an unlicensed resource, and M is a sending time of a pre-scheduling instruction.

In some embodiments, if the base station discovers that PRBS in pre-scheduling signalings of multiple UEs are identical, the base station sends subframe instruction signalings to these UEs, and different UEs are scheduled to different subframes.

A resource preempting signaling can be borne by a scheduling signaling scrambled by a C-RNTI, as well as DCI scrambled by an RA-RNTI and a P-RNTI, the subordinate UE is instructed to preempt a resource by defining a resource preempting signaling scrambled by a dedicated RNTI, or an idle UE is triggered to preempt a resource.

Before sending the pre-scheduling signaling, the base station judges that it is necessary to send pre-scheduling signalings to certain scheduled UEs on an unlicensed carrier according to a system resource on a licensed carrier and a received SR and/or BSR or determined data of the UEs, and then determines specific UEs to which the pre-scheduling signalings are sent according to a service priority of the UEs and geographic positions of the UEs and a subframe index transmitted by each UE.

In some embodiments, the base station determines which UEs perform transmission on the unlicensed carrier before sending the pre-scheduling signaling.

In some embodiments, a UE having a high service priority or a large BSR is directly scheduled on the licensed carrier, and a UE having a low service priority and a low delay requirement is scheduled to the unlicensed carrier.

In some embodiments, the base station selects UEs, which are uniformly distributed at geographic positions, to be scheduled to the same subframe.

The base station not only competes for a resource by itself, but also may trigger the UE to compete for a resource by sending the resource preempting signaling to the UE.

When the base station sends the resource preempting signaling to the UE, the pre-scheduling signaling and the resource preempting signaling are sent simultaneously, or the resource preempting signaling is sent before the pre-scheduling signaling according to a pre-defined timing relation.

When the two signalings are sent simultaneously, the UE learns of necessity for resource competition through an unlicensed carrier index in the pre-scheduling signaling, or the UE is informed through a dedicated resource preempting signaling.

At step S1604, the base station starts to compete for a resource on an unlicensed carrier according to a pre-defined rule.

Then, different steps are executed according to a condition that the base station competes for the resource or a condition that the base station learns of that the UE secures the resource.

If the base station competes for the resource, Step S1606 is executed.

If the UE secures the resource, Step S1608 is executed.

At step S1606, the base station sends a scheduling update signaling and/or a triggered scheduling signaling.

The triggered scheduling signaling is sent when the base station competes for the resource, and the UE is informed through an occupation signal, or a paging message, or DCI or an RRC message.

The triggered scheduling signaling is sent on a licensed carrier, or sent on the unlicensed carrier obtained by competition.

In some embodiments, the transmission signaling is sent to inform the UE of uplink data transmission, and may include a transmission subframe index of the UE.

In some embodiments, the base station sends the triggered scheduling signaling and/or the scheduling update signaling according to a time of obtaining resource by competition.

If a time interval difference between the time of the pre-scheduling signaling and the resource obtaining time by competition is smaller than a pre-defined threshold T1, the base station only sends a transmission instruction, and the UE transmits data according to a timing relation obtained by adding 4 to the time of the pre-scheduling signaling.

If a time interval difference between the time of the pre-scheduling signaling and the resource obtaining time by competition is greater than a pre-defined threshold T1 and smaller than a pre-defined threshold T2, the base station sends the triggered scheduling signaling, and the UE transmits data on an uplink subframe nearest to a secured resource.

If a time interval difference between the time of the pre-scheduling signaling and the resource obtaining time by competition is greater than a pre-defined threshold T2, the base station sends a scheduling supplementary signaling or an update signaling to instruct the UE to perform uplink data transmission according to a new scheduling signaling.

Or, the base station only discovers that the pre-scheduled cannot fully occupy the whole bandwidth to send scheduling update information.

Or, when the base station obtains new channel state information and the channel state information is largely different from the previous channel state information, the base station sends scheduling update information.

Or, when the UE has a new SR or a BSR is larger, the base station sends scheduling update information.

A new scheduling signaling instructs the UE about one or more pieces of subframe data transmission information, including modulation and coding information, resource position information, subframe index information and the like.

In some embodiments, the base station selects different frame structures according to the securing time and sends different pieces of information.

If the resource obtaining time by competition is exactly a subframe boundary, the base station sends a downlink subframe, and subsequently sends an uplink subframe, and the downlink subframe includes an order of UE transmission on subsequent uplink subframes within an occupation period.

Herein, the first three uplink subframes sequentially correspond to uplink subframes scheduled by the pre-scheduling signaling sent at N−3, N−2 and N−1.

Meanwhile, if the PRB of the previously-scheduled UE is different from the PRB of the UE pre-scheduled at N−3, N−2 and N−1, the base station sends a scheduling instruction to schedule other pre-scheduled UEs to PRBs corresponding to N+1, N+2 and N+3 subframes.

Or, the base station sends a sequence of several symbols and informs the UE, and after receiving the sequence, the UE immediately sends the sequence.

If the resource obtaining time by competition is not a subframe boundary and multiple Orthogonal Frequency Division Multiplexing (OFDM) symbols exist, the base station sends a synchronization signal or only DCI or a measurement signal. Meanwhile, a signaling instruction indicative of that the resource has been preempted is sent to the UE at a pre-defined resource frequency domain position.

At step S1608, the uplink data sent by the UE is received and/or a scheduling update signaling is sent.

By means of relevant information sent by the UE, the base station learns of that the UE secures the resource, and then receives the uplink data of the UE according to pre-scheduling information.

Furthermore, the base station may also send the scheduling update signaling within the occupation period.

For example, when the base station discovers that the pre-scheduled UE cannot achieve a bandwidth in a control requirement, the base station sends scheduling update information.

Or, when the base station obtains new channel state information and the channel state information is largely different from the previous channel state information, the base station sends scheduling update information.

Or, when the UE has a new SR or a BSR is larger, the base station sends scheduling update information.

Figure 17:
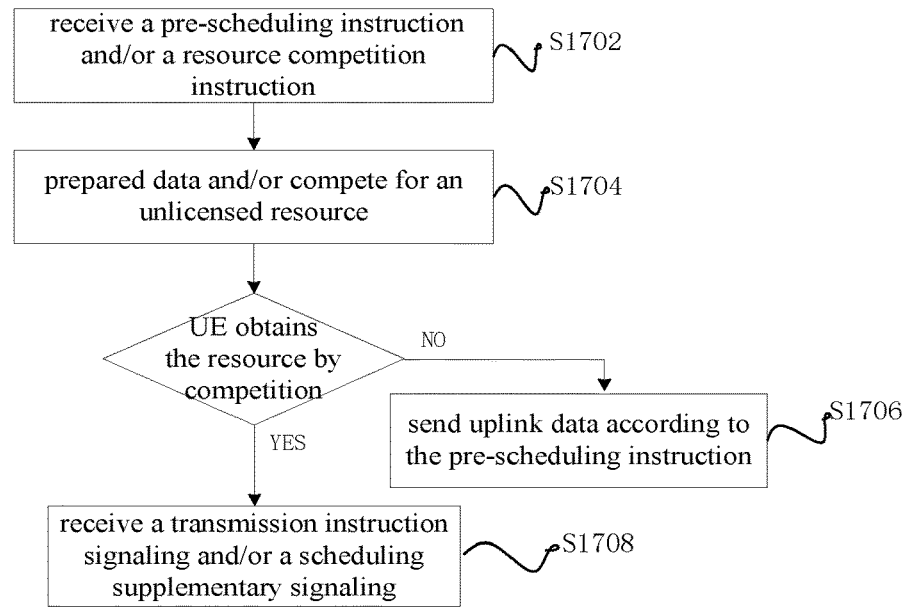
FIG. 17 is a flowchart of description of an unlicensed uplink data processing process from a terminal side according to an embodiment of the present disclosure.

FIG. 17 is a flowchart of description of an unlicensed uplink data processing process from a terminal side according to an embodiment of the present disclosure. As shown in FIG. 17, the flow includes the steps S1702 to S1708.

At step S1702, a UE receives a resource preempting signaling and/or a pre-scheduling signaling.

Herein, the resource preempting signaling is alternative.

The resource preempting signaling is implicitly instructed by the pre-scheduling signaling or borne by means of a dedicated signaling through paging, msg2 or other dedicated RRC messages, and a resource preempting time is pre-defined to start preempting after receiving a preempting signaling or preempting according to a given preempting CCA position.

The pre-scheduling signaling may include more of an MCS, a PRB, a carrier index, a CCA position and a subframe index.

Herein, the subframe index instructs a subframe for uplink data transmission after the UE secures a resource, and is represented by a subframe offset from the resource obtaining time by competition or a subframe bitmap.

The UE judges to be pre-scheduled or normally scheduled by means of an RNTI scrambling identifier, and the UE judges to be pre-scheduled on an unlicensed carrier or normally scheduled on a licensed carrier through the carrier index instruction information.

Step S1704: Data preparation and/or competition for an unlicensed resource are/is performed, and according to the received pre-scheduling signaling, the UE starts to code and modulate data according to the MCS and the PRB and/or to compete for a resource.

In some embodiments, if the pre-scheduled UE performs modulation and coding, immediate sending cannot be performed, and sending will be performed until the base station or the UE or other UEs preempt the unlicensed resource.

The UE may compete for the resource according to one of the following manners:

Manner 1: the UE performs detection competition by taking a full bandwidth as a unit;

Manner 2: the UE performs competition by taking a sub-band where the PRB in the scheduling signaling is located as a unit; and Manner 3: the UE only performs competition on the scheduled PRB.

Then, different steps are executed according to a condition that the base station competes for the resource or a condition that the UE secures the resource. If the UE secures the resource, step S1706 is executed. If the base station competes for the resource, step S1708 is executed.

At step S1706, after securing the resource, the UE directly starts to perform uplink data transmission according to pre-scheduling information.

Or, the condition that the UE performs data transmission is determined according to different resource securing times.

If the UE secures the unlicensed resource and the resource obtaining time by competition is exactly a subframe boundary, the UE sends prepared data to a PRB corresponding to a first subframe according to the pre-scheduling signaling, and meanwhile, the UE sends, at a pre-defined position, an instruction signaling indicative of that the resource is preempted to the base station and other UEs.

If the resource obtaining time by competition of the UE is not the subframe boundary, the UE sends an occupation signal on the unlicensed carrier obtained by competition to inform other UEs, the occupation signal carries cell ID information, and the occupation signal of each UE is orthogonal. For example, cyclic shifts will be different in case of a sequence. The UE that receives scheduling information learns of information indicative of that the resource is available according to the occupation signal at a subframe boundary position, and then performs data transmission.

A transmission instruction or scheduling supplementary signaling sent by the base station may be received subsequently, and uplink transmission is performed according to this signaling.

At step S1708, a triggered scheduling signaling and/or a scheduling supplementary signaling are/is received. The UE receives an instruction that is sent by the base station and is indicative of resource preempting or transmission instruction information, and performs uplink data transmission.

If the base station competes for an unlicensed resource, the UE transmits, according to a signaling instruction, the prepared data on a subframe nearest to a time when the base station informs the UE to perform transmission, or after receiving instruction information indicative of that the base station preempts the resource, the UE performs uplink data transmission according to a timing relation of N+4, where N is a pre-scheduling time. If an N+4 subframe is not an uplink subframe, the data is transmitted on an uplink subframe nearest to N+4, or the UE transmits the data on the corresponding uplink subframe according to a subframe index instruction in the pre-scheduling signaling sent by the base station.

Exemplary embodiments of the present disclosure will be illustrated below with reference to the above-mentioned embodiment.

Embodiment One

In the present exemplary embodiment, sending, by a base station, a pre-scheduling signaling to a UE is illustrated in detail, and in the embodiment, only the base station participates in competition.

It is supposed that the base station determines to schedule certain UEs on an unlicensed carrier and sends pre-scheduling signalings to some of the scheduled UEs at an $M^{th}$ time before competing for the unlicensed resource, and the pre-scheduling signaling includes: UL grant information such as a carrier index, the number of allocated PRBs, positions of the PRBs, and an MCS, or further includes subframe index instruction information.

Herein, the base station determines to send a pre-scheduling signaling to a relevant UE according to an SR or BSR of the UE or determined data of the UE, a service priority and a situation about a system resource on a licensed carrier.

The base station preferably schedules a UE having a high service priority or a large BSR on the licensed carrier, and the base station may pre-schedule a UE having a low service priority or a low delay requirement or a low BSR to the unlicensed carrier.

The base station determines the PRB and the MCS according to a latest channel measurement result or an experience value or a conservative value.

Subframe instruction information instructs a subframe position for uplink data transmission of the UE, and is represented by an offset from a time of obtaining resource by competition of the base station. If the scheduled UE performs transmission on multiple subframes, the information may be represented by a bitmap.

The pre-scheduling signaling is sent on the licensed carrier before the base station starts to preempt the unlicensed carrier.

After receiving the signaling, the UE recognizes that scheduling is pre-scheduling on the unlicensed carrier rather than normal scheduling on the licensed carrier through an RNTI.

Herein, a dedicated RNTI sequence identifier PRE-RNTI of a pre-scheduling control signaling is defined. It is supposed that the PRE-RNTI is 1111111100000000, and pre-scheduling information is scrambled by using this sequence before the base station sends the information. During blind detection, the UE attempts to descramble by using this sequence. If being descrambled successfully, the pre-scheduling information is pre-scheduling control information, and if the pre-scheduling information is descrambled successfully by means of the existing C-RNTI, scheduling is normal scheduling.

Or, the UE determines the unlicensed carrier through a carrier index, and does not receive instruction information about resource securing, so as to judge this scheduling to be pre-scheduling. The UE starts to prepare data according to PRB and MCS information in the UL grant, and codes and modulates the data.

The base station starts to compete for a resource after sending the pre-scheduling signaling. Time needed for resource competition is about few tens of microseconds or several milliseconds, and the base station may continuously send pre-scheduling information to other UEs within this period of competition time. That is, the base station may send pre-scheduling signalings to multiple UEs on multiple subframes. Or, the base station arranges pre-scheduled UEs in a scheduling order to form a scheduling queue, and the base station sequentially sends pre-scheduling signalings to the UEs according to an order of the UEs in the queue.

The subframe index instruction information may be provided in the pre-scheduling signaling in advance. Or, before the resource is obtained by competition, if the base station discovers that PRBS in pre-scheduling signalings of multiple UEs are identical, the base station may add subframe instruction information into pre-scheduling signalings of subsequent UEs, send the subframe instruction information to these UEs, and schedule different UEs to different subframes. Moreover, the base station distributes geographic positions of UEs scheduled by each subframe as uniformly as possible, so as to prevent from preempting a carrier due to the fact that it is judged to be idle when energy is lower than a threshold during detection through other stations or equipment.

The base station judges whether it is necessary to send subframe instruction information to the UE according to the resource obtaining time by competition. When the resource obtaining time by competition and the sending time of the pre-scheduling signaling are greater than 4 ms, the base station provides subframe instruction information in transmission instruction information or scheduling update information.

For example, the base station sends, at a time M, a pre-scheduling signaling to a UE1 that allocates PRBs with indexes of 4-6, and then sends, at a time M+1, a pre-scheduling signaling to a UE2 that allocates PRBs with indexes of 5-7. If the base station competes for a resource at a time M+4, the base station only needs to inform the UEs of information about resource securing through a licensed carrier or an occupation signal or other sequences, and then the two UEs perform uplink data transmission on the unlicensed resource secured by the base station according to an existing timing relation of LTE between a UL grant and a Physical Uplink Shared Channel (PUSCH). If the base station competes for a resource at a time greater than M+4, the two UEs perform transmission on a nearest uplink subframe according to a default rule, and data of the two UEs will collide with each other due to the same PRBs of the UE1 and the UE2. In this case, the base station sends subframe instruction information such as information corresponding to an N time offset, sends 10 to the UE1 to instruct to transmit on a second subframe where the resource is obtained by competition, and sends 11 to the UE2 to instruct the UE to transmit on a third subframe where the resource is obtained by competition. The PRBs are still at original positions. If the PRBs of the two UEs are different in position, the UE may send data on a first uplink subframe where the resource is obtained by competition in a default manner. The similar manner may be adopted for handling a situation for pre-scheduling multiple UEs. That is, if the difference between the UL grant receiving time of the UE and the resource obtaining time by competition of the base station is smaller than or equal to 4, the UE sends data according to an original timing relation. If the resource obtaining time by competition exceeds 4, the UE sends data on the nearest uplink subframe after the base station competes for the resource. If the base station discovers that positions of PRBs of multiple UEs are identical, the base station needs to send subframe instruction information to the UEs.

Embodiment Two

In the present exemplary embodiment, a specific process of informing, by a base station, a UE after securing a resource and performing, by the UE, uplink data transmission according to a pre-scheduling signaling is illustrated in detail.

The base station informs the UE of a scheduling signaling before securing the resource, and the UE codes and modulates data according to the signaling and waits for a resource competition result of the base station.

The base station competes for an unlicensed resource according to a pre-defined rule. After securing the resource, the base station needs to send transmission instruction information to inform the UE, in order that the UE sends uplink data after determining that the carrier is available.

The base station informs the UE of resource securing by means of one of the following manners, namely the transmission instruction information is borne by means of the following manners.

Manner 1: The base station pre-defines a licensed or unlicensed position to send a pre-defined sequence, and when detecting the sequence, the UE knows that the pertaining base station competes for the resource.

The sequence corresponds to the secured band, or different frequency domain positions correspond to the secured band. Moreover, different cells have different sequence identifiers.

The sequence is a PSS/SSS or a preamble or a reference signal.

A certain frequency domain position of the licensed carrier or the unlicensed carrier is pre-defined and supposed as CC1-CCk.

Different base stations have a sequence associated with an ID. For example, the sequence is a PSS or an SSS. If a base station 1 secures a resource, the base station sends the PSS sequence of the present cell at the frequency domain position, and if the position cannot be fully mapped by a PSS, the repeated manner is adopted.

Figure 18:
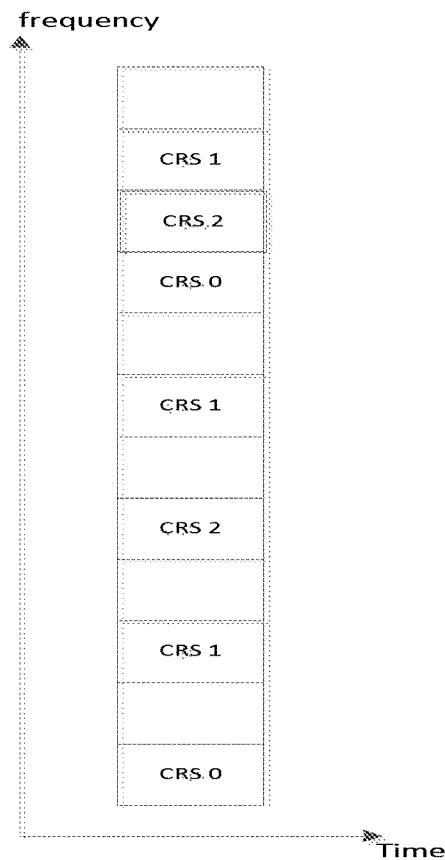
FIG. 18 is a diagram of a manner of sending a reference signal to a UE after a base station preempts a resource according to Exemplary Embodiment two of the present disclosure.

Sequences sent by different base stations are identified by different frequency domain patterns. For example, the base station 1 that preempts the unlicensed resource sends CRS1 on some carriers at pre-defined positions, and if preempts the unlicensed resource, a base station 2 sends CRS2 on different frequency domain carriers. FIG. 18 is a diagram of a manner of sending a reference signal to a UE after a base station preempts a resource according to Exemplary Embodiment two of the present disclosure. As shown in FIG. 18, after securing resources, different base stations send CRSs on different carriers.

Or, each base station corresponds to a preamble sequence one to one. After securing the resource, the base station sends an own preamble at a pre-defined frequency domain position, and the preamble may fully occupy the carrier in a repeated manner.

The UE determines whether the pertaining base station competes for a resource by blindly detecting a sequence corresponding to the pertaining base station or a corresponding frequency domain position at the pre-defined frequency domain position. If detection is correct, it is learnt of that the base station competes for the unlicensed resource, and the UE may transmit data on a corresponding subframe according to the pre-scheduling signaling.

Manner 2: The base station informs the UE of a signaling, and the signaling may include a DCI signaling.

The signaling may be transmitted on a licensed carrier, or directly transmitted on the unlicensed carrier obtained by competition.

If the signaling is DCI, 1-bit may be borne in a common searching space or borne in a private searching space.

Manner 3: The base station sends an occupation signal on the unlicensed carrier obtained by competition, and the signal is associated with a cell ID in a one-to-one correspondence manner. After detection, the UE will know that the pertaining base station of the UE secures the unlicensed resource.

Sending of the occupation signal under this manner is similar to Manner 1, but the occupation signal is directly sent on the unlicensed carrier secured by the base station.

After learning of that the base station obtains the unlicensed carrier by competition, the UE transmits data on the corresponding subframe according to a subframe instruction in the pre-scheduling signaling or a pre-defined rule.

The pre-defined rule may refer to that: the UE compares the resource preempting time with the pre-scheduling receiving time, and if the time difference is smaller than 4 ms, the UE sends prepared data on a PRB of the nearest uplink subframe according to a principle of adding 4 ms to a pre-scheduling signaling subframe.

If the time difference exceeds 4 ms, the UE preferably transmits data on a PRB corresponding to a first uplink subframe.

Under this situation, the base station does not send a scheduling update signaling, and the UE transmits data according to the pre-scheduling signaling. If the base station sends the scheduling update signaling, the UE needs to transmit data according to the scheduling update signaling.

Embodiment Three

In the present exemplary embodiment, a method for triggering, by a base station, a UE to compete for a resource is illustrated.

The UE triggered to compete for an unlicensed resource includes an idle UE and a UE having an SR.

The UE having the SR competes for an unlicensed resource in two manners:

Manner 1: a pre-defined period manner, where the UE competes for the resource at some unlicensed bands according to a pre-defined period such as an SR period or other configuration periods; and Manner 2: DCI-based dynamic trigger or NACK signaling-based trigger.

The DCI-based dynamic trigger manner is divided into two sub-manners.

Sub-manner 1: UL grant implicit instruction manner, where the UE that receives a UL grant judges a carrier to be a licensed carrier or an unlicensed carrier according to a carrier instruction domain, and if the scheduled carrier is the unlicensed carrier, resource competition is performed first.

Herein, a subframe position of CCA may be provided in the pre-scheduling signaling. For example, 010001 instructs the UE to perform CCA on a second subframe and a sixth subframe after the pre-scheduling signaling in a bitmap manner. If competition succeeds, the UE directly sends modulated and coded data on the preempted carrier or send according to a timing relation. If competition fails, the UE continuously waits for a competition result of the base station or other UEs.

The base station may send CCA-related configuration information to multiple UEs simultaneously, and subframes of the multiple UEs for CCA may be identical.

Sub-manner 2: explicit signaling informing manner, where a dedicated bit domain is defined to instruct the UE to compete for a resource.

The manner may be one-to-one, that is, a signaling is borne by means of a 1 bit signaling domain in DCI of a C-RNTI. For example, 1 represents that the UE competes for the resource, and 0 represents that the UE does not compete. The manner may be one-to-multiple, that is, a signaling triggers multiple UEs to compete, and the signaling is borne in a common searching space by defining a dedicated RRC message or defining DCI scrambled by a new cluster or group RNTI. A public message addition competition signaling instructs a specific UE to participate in competition (for example, instructing the UE according to a UE order bitmap), and the UE starts to compete for a resource on a corresponding subframe or in a time slot according to the order and instruction. A private message is an unlicensed resource in specific competition.

Or, all UEs that receive NACK signalings fed back by the base station need to compete.

A manner for triggering the idle UE to compete includes:

Manner 1: pre-defining a corresponding relationship between an unlicensed band and a UE ID in a cell, each UE performing CCA on a managed band according to a period;

Manner 2: triggering the UE to compete through a paging message, the paged UE competes for a resource, a paging time corresponding to a competition time or carrier, specifically, the base station sends a paging message at a subframe position corresponding to a paging period according to paging-related information configured by a high layer, after detecting the own paging message, the UE immediately executes CCA or predefines a timing relation +T between the CCA execution time and the sending time of the paging message, or it is paged that the UE performs CCA on an unlicensed band f1 at the paging time T1, and it is paged that the UE performs CCA on an unlicensed band f2 at the paging time T2; and Manner 3: The UE is informed of competition through MSG2.

All UEs that successfully receive RARs need to compete for unlicensed resources.

A specific process of triggering, by the base station, the UE to compete in this manner is as follows.

Firstly, the base station broadcasts Physical Random Access Channel (PRACH) resources corresponding to an unlicensed resource of the present cell, and some UEs select one of them to send a PRACH preamble sequence on the unlicensed resource.

Then, the base station sends MSG2 including an RAR message to these UEs. The message is sent on a licensed carrier, and the UE that successfully receives the message needs to compete for a resource on the unlicensed resource corresponding to the previously-sent preamble sequence.

The UE that succeeds in competition directly sends msg3 thereon, and UEs that fail in competition fail in access.

There are three frequency domain positions for specific competition of the UE through the DCI competition triggering manner.

First, each UE only competes for a PRB corresponding to scheduling, sets a timer, directly transmits the PRB after securing the PRB without needing to inform other UEs, and gives up when the PRB is not secured and the timer expires.

Second, multiple UEs that receive UL grants compete on the whole system bandwidth. After securing, one of the UEs informs other UEs (through an occupation signal or a broadcast), and the UEs are fully scheduled to transmit data on corresponding PRBs according to a scheduling signaling.

Third, competition is performed on a corresponding sub-band where the scheduling PRB is located.

The uplink bandwidth is pre-defined and divided into multiple sub-bands, and the UE competes by using a sub-band where the PRB in the scheduling signaling is located as a unit.

Other trigger manners refer to resource competition on the whole bandwidth.

After preempting the resource, the UE sends an occupation signal to inform the base station, and the occupation signal is a preamble sequence corresponding to a cell ID, and is informed to other UEs in the cell or the base station.

The UE competition triggering time of the base station and the sending time of the pre-scheduling signaling are not in an order.

Embodiment Four

In the present exemplary embodiment, a situation that a base station sends a scheduling update signaling after the base station or a subordinate UE secures a resource is illustrated.

The scheduling update signaling is sent under the following conditions.

For example, an interval between a pre-scheduling time and a time of obtaining resource by competition is large, so previous scheduling information or resource allocation information has failed for a rapid-varying channel, or the base station re-acquires new channel state information, and therefore the base station may send a new scheduling signaling to the UE to improve the spectrum efficiency after securing the resource.

Or, previous services of some UEs have been transmitted on the licensed carrier or other unlicensed carriers, and a new uplink service needs to be scheduled, so the base station also needs to send a UL grant to instruct a method for transmitting, by the UE, uplink data within an unlicensed occupation period.

Or, the BSR of the UE exceeds a threshold.

Under the above-mentioned situation, after securing the resource, the base station sends DCI to instruct a UL grant of a UE that is truly scheduled on the unlicensed carrier and a subframe index where the scheduled UE is located, or a UL grant of a newly-scheduled UE.

The scheduling information sent by the base station includes one of the following:

a scheduled UE instruction and UL grant within an occupation period, a subframe transmission order of the UE, and/or multiple pieces of subframe transmission information of the UE.

Specifically, a subframe instructing transmission of the previously pre-scheduled UE is instructed by a bitmap, or instructed by a defined offset of a scheduling information sending subframe. A specific manner is pre-defined. For example, a certain UE is scheduled to send on a second subframe of the scheduling information sending subframe, so it may be instructed by using a subframe bitmap 01 manner, or may be instructed by using an offset value 2 (corresponding to bit 10).

If the difference between the resource obtaining time by competition and the pre-scheduling time is within a pre-defined threshold, or a channel state changes within this period of time slowly, the base station sends subframe index instruction information to the pre-scheduled UE.

If the difference between the resource obtaining time by competition and the pre-scheduling time is beyond the pre-defined threshold, or the channel state changes within this period of time quickly, or the BSR of the UE exceeds the threshold, the base station sends new scheduling instruction information to schedule the UE within an occupation period.

The information may instruct the UE to send data on a subframe, if the data of the UE cannot be completely sent on one subframe, the data may be sent on multiple subframes, and the base station informs the UE of scheduling information of multiple sub-frames through DCI.

Embodiment Five

In the present exemplary embodiment, a method for sending, by a base station, a triggered scheduling signaling or a scheduling update or supplementary signaling after the base station or a UE preempts a resource or determining, by the UE, a subframe for uplink data transmission is illustrated in detail.

The base station sends a relevant instruction according to a time interval between a sending time of a pre-scheduling signaling and a time of obtaining resource by competition.

For example, it is supposed that the time interval therebetween is smaller than a pre-defined threshold T1, and T1 is smaller than 4 ms. If the base station competes for the resource, the base station only sends an instruction signaling about resource securing, and the UE sends data on a nearest uplink subframe according to a timing relation obtained by adding 4 to the time of the pre-scheduling signaling.

It is supposed that the time interval therebetween is greater than the pre-defined threshold T1 and smaller than a pre-defined threshold T2, and T2 is hundreds of milliseconds. If the base station competes for the resource, the base station sends instruction information about resource securing, and the UE sends the pre-processed data out on the nearest uplink subframe.

Or, the UE directly transmits data on the nearest uplink subframe without comparison.

If the time interval therebetween is greater than the pre-defined threshold T2, the base station sends a scheduling supplementary signaling or a scheduling update signaling to give, to the UE, an instruction of a new subframe transmission position and/or a new UL grant.

If the UE competes for the resource and the time interval therebetween is smaller than or equal to the pre-defined threshold T2, the UE will immediately transmit data after securing the resource. If the time interval therebetween is greater than the pre-defined threshold T2, the UE sends an occupation signal or a measurement signal first, and the UE will transmit data according to the scheduling update signaling until the base station sends the scheduling update signaling.

Or, the UE does not perform comparison, and will send the modulated and coded data after securing the resource. If the data is not prepared, the UE will continuously send an occupation signal or a measurement signal and then immediately send the modulated and coded data.

Embodiment Six

In the present exemplary embodiment, uplink data transmission is illustrated with reference to a frame structure.

A frame structure where uplink data is transmitted or an uplink/downlink subframe configuration in a TDD frame structure is determined according to a resource securing subject, a time of obtaining resource by competition and an uplink/downlink service volume.

Herein, an uplink/downlink subframe order or proportion of the TDD frame structure is identical to the existing order or proportion of LTE or is re-defined.

Figure 19:
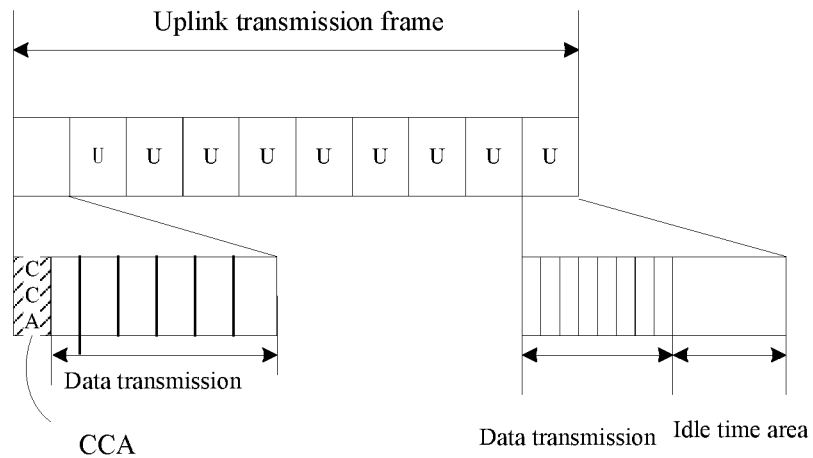
FIG. 19 is a diagram showing that a UE secures a resource and a frame structure only includes an uplink subframe according to Exemplary Embodiment six of the present disclosure.

There are two frame structures adopted for a UE to secure a resource. One is a frame structure where all unlicensed resource obtained by competitions are used for uplink data transmission within an occupation period, that is, the frame structure only includes an uplink subframe U. FIG. 19 is a diagram showing that a UE secures a resource and a frame structure only includes an uplink subframe according to Exemplary Embodiment six of the present disclosure. As shown in FIG. 19, the UE performs CCA resource competition at a starting position of a first subframe.

If the time of securing the unlicensed resource by the UE is exactly a subframe boundary, the UE sends prepared data to a PRB corresponding to the first subframe according to a pre-scheduling signaling, and meanwhile, other PRB positions send repeated data. Meanwhile, the UE sends an instruction signaling about resource preempting to the base station and other UEs at a pre-defined position, and after knowing that the UE preempts the resource, the other UEs will start to send corresponding data according to the previous pre-scheduling signaling of the base station.

Figure 20:
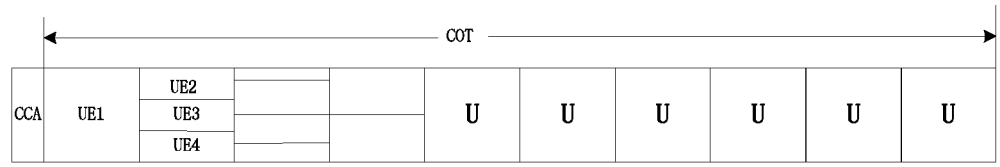
FIG. 20 is a diagram showing that a UE secures a resource at a subframe boundary exactly and a frame structure only includes an uplink subframe according to Exemplary Embodiment six of the present disclosure.

FIG. 20 is a diagram showing that a UE secures a resource at a subframe boundary exactly and a frame structure only includes an uplink subframe according to Exemplary Embodiment six of the present disclosure. As shown in FIG. 20, an occupation time COT 10 ms is taken as an example. A UE1 sends uplink data on a first subframe after securing a resource, and other UEs such as a UE2, a UE3 and a UE4 start to send uplink data on the resource secured by the UE1 from a second subframe. During the middle of this period, if a UE sends a new SR or the base station sends new DCI or NACK feedback information on a licensed carrier according to the magnitude of a BSR, the UE continuously retransmits new data or the previous data on the occupied unlicensed carrier.

Figure 21:
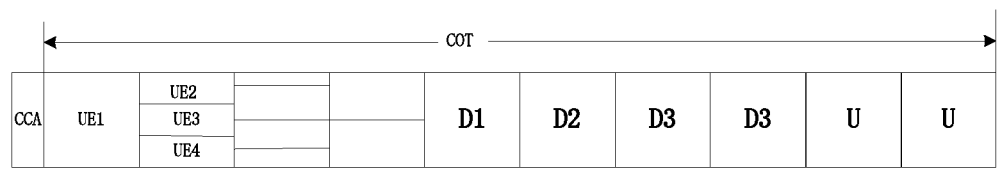
FIG. 21 is a diagram showing that a UE secures a resource at a subframe boundary exactly and a frame structure includes both an uplink subframe and a downlink subframe according to Exemplary Embodiment six of the present disclosure.

Certainly, the DCI may be directly sent on the unlicensed carrier. FIG. 21 is a diagram showing that a UE secures a resource at a subframe boundary exactly and a frame structure includes both an uplink subframe and a downlink subframe according to Exemplary Embodiment six of the present disclosure. As shown in FIG. 21, the frame structure adopts a TDD manner. The base station sends DCI and downlink data on a first downlink subframe D1, the DCI including received ACK/NACK information fed back by the UE, and scheduling allocation information of a subsequent uplink subframe such as scheduling update information mentioned in the embodiment of the present disclosure.

Figure 22:
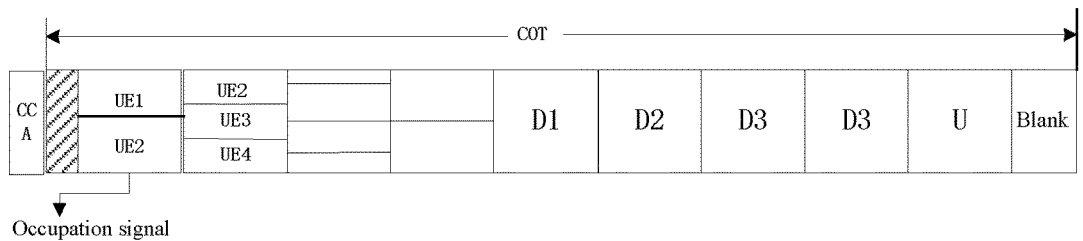
FIG. 22 is a diagram showing that a UE secures a resource not at a subframe boundary uplink subframe according to Exemplary Embodiment six of the present disclosure.

If the resource obtaining time by competition of the UE is not the subframe boundary, the frame structure for uplink data transmission may adopt a manner as shown in FIG. 22. FIG. 22 is a diagram showing that a UE secures a resource not at a subframe boundary uplink subframe according to Exemplary Embodiment six of the present disclosure. After preempting the resource, the UE will immediately send an occupation signal on the unlicensed carrier obtained by competition to inform other UEs, the occupation signal carrying cell ID information. If multiple UEs preempt the resource simultaneously, each UE sends an occupation signal, and the occupation signals of all the UEs are orthogonal. For example, cyclic shifts will be different in case of a sequence. The UE that receives scheduling information learns of information indicative of that the resource is available according to the occupation signal at a subframe boundary position, and then performs data transmission from the first subframe.

When the base station competes for the resource, only the TDD frame structure is adopted.

Figure 23:
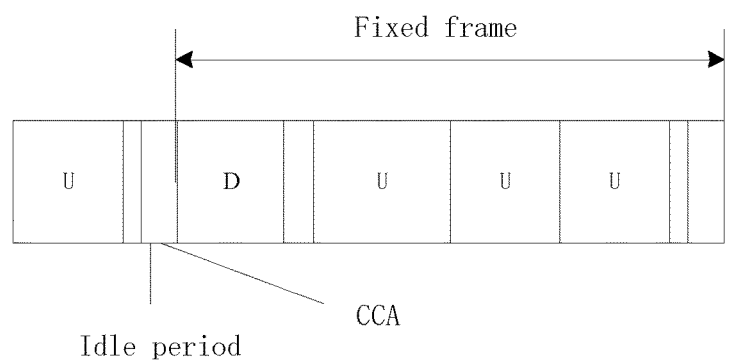
FIG. 23 is a diagram showing that a base station competes for a resource at a subframe boundary uplink subframe exactly according to Exemplary Embodiment six of the present disclosure.

If the base station competes for the resource at a time N and the resource obtaining time by competition is the subframe boundary, the frame structure may adopt a structure as shown in FIG. 23. FIG. 23 is a diagram showing that a base station competes for a resource at a subframe boundary uplink subframe exactly according to Exemplary Embodiment six of the present disclosure. The base station sends downlink data of a subframe on the unlicensed carrier obtained by competition, the downlink data includes a measurement signal or a synchronization signal or repeated downlink data, or may include DCI for instructing some pieces of information about uplink transmission of the UE within an occupation period or the scheduling update information mentioned in the present disclosure, it is at least ensured that the resource is occupied, and meanwhile, the base station sends instruction information about resource securing to the UE on a pre-defined licensed or unlicensed resource, in order that the UE starts to perform uplink transmission on a next uplink subframe according to the previous pre-scheduling information.

Figure 24:
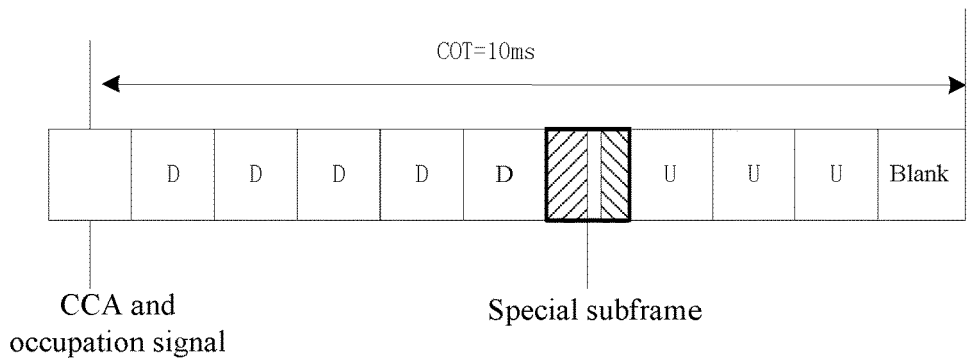
FIG. 24 is a diagram showing that a base station competes for a resource not at a subframe boundary uplink subframe according to Exemplary Embodiment six of the present disclosure.

If the resource obtaining time by competition of the base station is not the subframe boundary, the base station sends an occupation signal on the unlicensed resource obtained by competition to inform other UEs of successful preempting, and if there are resources, a scheduling update or supplementary signaling may be sent. As shown in FIG. 24, FIG. 24 is a diagram showing that a base station competes for a resource not at a subframe boundary uplink subframe according to Exemplary Embodiment six of the present disclosure.

It is important to note that in the TDD frame structure in the present exemplary embodiment, an idle time is needed between uplink and downlink subframes for uplink/downlink conversion, the idle time being not given in some graphic examples.

By means of the unlicensed resource data scheduling and transmission method provided in the above-mentioned embodiment and exemplary embodiments, the problems of resource competition and data scheduling and transmission of LTE during uplink data transmission on an unlicensed carrier are solved, and the resource utilization rate is improved.

Obviously, a person skilled in the art should understand that all of the above-mentioned modules or steps in the present disclosure may be implemented by using a general calculation device, may be centralized on a single calculation device or may be distributed on a network composed of multiple calculation devices. In some embodiments, they may be implemented by using executable program codes of the calculation devices. Thus, they may be stored in a storage device and executed by the calculation devices, the shown or described steps may be executed in a sequence different from this sequence under certain conditions, or they are manufactured into each integrated circuit module respectively, or multiple modules or steps therein are manufactured into a single integrated circuit module. Thus, the present disclosure is not limited to a combination of any specific hardware and software.

The above is only the exemplary embodiments of the present disclosure, and not intended to limit the present disclosure. Those skilled in the art can easily conceive that within the technical scope of the present disclosure, modification or substitution shall be covered under the scope of the accompanied claims of the present disclosure. Therefore, the scope of protection of the disclosure shall be subject to the scope of protection of the claims.

What is claimed is:

1. A data transmission method, comprising:
    sending a pre-scheduling signaling to a User Equipment (UE) before competing for an unlicensed carrier, and the pre-scheduling signaling for instructing the UE to transmit data on an unlicensed carrier obtained by competition; and
    transmitting the data with the UE according to the pre-scheduling signaling;
    wherein before transmitting the data with the UE according to the pre-scheduling signaling, the method further comprises: sending a scheduling update signaling for updating the pre-scheduling signaling to the UE; and transmitting the data with the UE according to the pre-scheduling signaling comprises: transmitting the data with the UE according to the pre-scheduling signaling and the scheduling update signaling;
    wherein the scheduling update signaling for updating the pre-scheduling signaling is sent to the UE under at least one of the following conditions: after the pre-scheduling signaling is sent to the UE and before competing for the unlicensed carrier, acquiring uplink channel state information updated by the UE, and when a channel state change exceeds a pre-defined threshold, sending the scheduling update signaling to the UE; when the UE corresponding to the pre-scheduling signaling does not meet requirements for preempting the bandwidth of the non-grant carrier, sending the scheduling update signaling to the UE; and when the UE corresponding to the pre-scheduling signaling has a new SR or the BSR is greater than a pre-set value, sending the scheduling update signaling to the UE.

2. The method as claimed in claim 1, wherein the pre-scheduling signaling comprises at least one of the following information:
    carrier index of the unlicensed carrier, positions and number of Physical Resource Blocks (PRB) allocated to the UE, a Modulation and Coding Scheme (MCS), subframe position of the unlicensed carrier on which the data transmission is performed by the UE, and a process number of a Hybrid Automatic Repeat Request (HARQ) for data retransmission of the UE.

3. The method as claimed in claim 2, the information about the subframe position of the unlicensed carrier on which the data transmission is performed refers to an offset relative to the position of the unlicensed carrier obtained by a base station trough competition, which is a relative timing.

4. The method as claimed in claim 1, wherein sending the pre-scheduling signaling to the UE before competing for the unlicensed carrier comprises at least one of the following:

sending the pre-scheduling signalings corresponding to a plurality of UEs to the plurality of UEs on a plurality of subframes respectively; and sending the pre-scheduling signalings to the UEs according to a pre-set UE scheduling order.

5. The method as claimed in claim 1, wherein transmitting the data with the UE according to the pre-scheduling signaling comprises one of the following:

when a base station obtains the unlicensed carrier by competition, sending, to the UE, a triggered scheduling signaling for instructing to transmit the data with the UE, and transmitting the data with the UE according to the pre-scheduling signaling and the triggered scheduling signaling; and when the UE obtains the unlicensed carrier by competition, transmitting the data with the UE according to the pre-scheduling signaling.

6. The method as claimed in claim 5, wherein the triggered scheduling signaling for instructing to transmit the data with the UE is sent to the UE in at least one of the following ways:

sending a pre-set sequence on a pre-set licensed carrier and/or a pre-set unlicensed carrier, the pre-set sequence comprises the triggered scheduling signaling for instructing to transmit the data with the UE on the unlicensed carrier obtained by competition;

informing the UE through a physical signaling, the physical signaling comprises the triggered scheduling signaling for instructing to transmit the data with the UE on the unlicensed carrier obtained by competition; and sending an occupation signal on the unlicensed carrier obtained by competition, the occupation signal carrying the triggered scheduling signaling for instructing to transmit the data with the UE on the unlicensed carrier obtained by competition.

7. The method as claimed in claim 5, wherein sending the triggered scheduling signaling or the scheduling update signaling to the UE comprises one of the following:

when the unlicensed carrier obtained by competition is only used for a Frequency Division Duplex (FDD) mode, sending the triggered scheduling signaling or the scheduling update signaling to the UE on a licensed carrier, the FDD mode referring to that the unlicensed carrier is only used for uplink data transmission within an occupation period; and when the unlicensed carrier obtained by competition is only used for a Time Division Duplex (TDD) mode, sending the triggered scheduling signaling or the scheduling update signaling to the UE on a licensed carrier or a downlink subframe of the unlicensed carrier obtained by competition, the TDD mode referring to that the unlicensed carrier is used for both uplink data transmission and downlink data transmission within an occupation period.

8. The method as claimed in claim 1, wherein the scheduling update signaling comprises at least one of the following:

updated uplink channel grant information, updated subframe position instruction information, offset information of an MCS, and offset information of a PRB.

9. The method as claimed in claim 1, wherein before transmitting the data with the UE according to the pre-scheduling signaling, the method further comprises:

sending, to the UE, a resource competition instruction for instructing the UE to compete for resources;

wherein the resource competition instruction is borne in at least one of the following ways:

the pre-scheduling signaling, a Negative Acknowledgement (NACK) message, a paging message, a message 2 in random access, and a Downlink Control Information (DCI) resource competition signaling scrambled by a Radio Network Temporary Identity (RNTI).

10. A data transmission method, comprising:

receiving a pre-scheduling signaling sent before a base station competes for an unlicensed carrier, the pre-scheduling signaling for instructing a User Equipment (UE) to transmit data on an unlicensed carrier obtained by competition; and transmitting the data with the base station according to the pre-scheduling signaling;

wherein before transmitting the data with the base station according to the pre-scheduling signaling, the method further comprises: receiving a scheduling update signaling, sent by the base station, for updating the pre-scheduling signaling; and transmitting the data with the base station according to the pre-scheduling signaling comprises: transmitting the data with the base station according to the pre-scheduling signaling and the scheduling update signaling;

wherein transmitting the data with the base station according to the pre-scheduling signaling comprises at least one of the following: when subframe position instruction information about data transmission does not exist in the pre-scheduling signaling and/or the scheduling update signaling, transmitting the data with the base station according to a subframe position determined by a pre-set rule, the pre-set rule comprises: determining the subframe position for transmitting the data with the base station by comparing a receiving time of the pre-scheduling signaling with a time of obtaining resource by competition; when subframe position instruction information for instructing a subframe position for transmitting the data with the base station exists in the pre-scheduling signaling and/or the scheduling update signaling, transmitting the data with the base station according to the subframe position instructed by the subframe position instruction information; and transmitting the data with the base station on a nearest uplink subframe after the UE obtains resources by competition.

11. The method as claimed in claim 10, wherein transmitting the data with the base station according to the pre-scheduling signaling comprises one of the following:

when the base station obtains the unlicensed carrier by competition, receiving a triggered scheduling signaling, sent by the base station, for instructing to transmit the data with the UE, and transmitting the data with the base station according to the pre-scheduling signaling and the triggered scheduling signaling; and when the UE obtains the unlicensed carrier by competition, transmitting the data with the base station according to the pre-scheduling signaling.

12. The method as claimed in claim 10, wherein transmitting the data with the base station according to the subframe position determined by the pre-set rule comprises at least one of the following:

when a time interval between the time of the pre-scheduling signaling and the resource obtaining time by competition is smaller than a first pre-set threshold T1, transmitting the data with the base station on an uplink subframe nearest to a radio frame according to a timing relation obtained by adding a pre-set time length to the time of the pre-scheduling signaling;

when a time interval between the time of the pre-scheduling signaling and the resource obtaining time by competition is greater than a first pre-set threshold T1 and smaller than a second pre-set threshold T2, transmitting the data with the base station on an uplink subframe nearest to a secured resource; and when a time interval between the time of the pre-scheduling signaling and the resource obtaining time by competition is greater than a second pre-set threshold T2, transmitting the data with the base station according to the scheduling update signaling.

13. The method as claimed in claim 10, wherein before transmitting the data with the base station according to the scheduling update signaling, the method further comprises:
competing for an unlicensed carrier according to the resource competition signaling sent by the base station and/or a pre-set resource competition manner;
wherein the pre-set resource competition manner comprises at least one of the following:
competing for an unlicensed carrier within a pre-set competition period, competing for an unlicensed carrier according to a corresponding relationship between an Identity (ID) of the UE and an unlicensed band, competing for an unlicensed carrier at a pre-set data transmission time of an uplink Hybrid Automatic Repeat Request (HARQ), and competing for an unlicensed carrier at a time that is ahead of a pre-set data transmission time of an uplink HARQ by a pre-set length.

14. The method as claimed in claim 10, wherein receiving the pre-scheduling signaling sent before the base station obtains the unlicensed carrier by competition comprises one of the following:
judging, according to whether a dedicated Radio Network Temporary Identity (RNTI) scrambling identifier exists in a received scheduling signaling, the scheduling signaling to be the pre-scheduling signaling or a normal scheduling signaling, wherein the pre-scheduling signaling carries the RNTI scrambling identifier, and the RNTI scrambling identifier does not exist in the normal scheduling signaling; and
judging, according to a carrier index carried in a received scheduling signaling and whether a carrier corresponding to the carrier index is obtained by competition, the scheduling signaling to be the pre-scheduling signaling or a normal scheduling signaling, wherein when the carrier index carried in the received scheduling signaling corresponds to an unlicensed carrier, and a notification that the base station has obtained resources by competition is not received or the UE does not obtain resources by competition, then the scheduling signaling is the pre-scheduling signaling, and the scheduling signaling received after the base station competes for the resources is the normal signaling.

15. A data transmission device, comprising:
a first sending device, configured to send a pre-scheduling signaling to a User Equipment (UE) before competing for an unlicensed carrier, the pre-scheduling signaling for instructing the UE to transmit data on an unlicensed resource obtained by competition; and a first transmission module, configured to transmit the data with the UE according to the pre-scheduling signaling;
wherein the device further comprises: a second sending module, configured to send, before transmitting the data with the UE according to the pre-scheduling signaling, a scheduling update signaling for updating the pre-scheduling signaling to the UE, wherein the first transmission module is further configured to transmit the data with the UE according to the pre-scheduling signaling and the scheduling update signaling;
wherein the second sending module is further configured to send the scheduling update signaling for updating the pre-scheduling signaling to the UE under at least one of the following conditions: after the pre-scheduling signaling is sent to the UE and before competing for the unlicensed carrier, acquiring uplink channel state information updated by the UE, and when a channel state change exceeds a pre-defined threshold, sending the scheduling update signaling to the UE; when the UE corresponding to the pre-scheduling signaling does not meet requirements for preempting the bandwidth of the unlicensed carrier, sending the scheduling update signaling to the UE; and when the UE corresponding to the pre-scheduling signaling has a new SR or the BSR is greater than a pre-set value, sending the scheduling update signaling to the UE.

16. A data transmission device, comprising:
a first receiving module, configured to receive a pre-scheduling signaling sent before a base station competes for an unlicensed carrier, the pre-scheduling signaling for instructing a User Equipment (UE) to transmit data on an unlicensed resource obtained by competition; and
a second transmission module, configured to transmit the data with the base station according to the pre-scheduling signaling;
wherein the device further comprises: a second receiving module, configured to receive a scheduling update signaling, sent by the base station, for updating the pre-scheduling signaling before transmitting the data with the base station according to the pre-scheduling signaling, wherein the second transmission module is further configured to transmit the data with the base station according to the pre-scheduling signaling and the scheduling update signaling;
wherein the second transmission module comprises at least one of the following: a fifth transmission unit, configured to transmit, when subframe position instruction information about data transmission does not exist in the pre-scheduling signaling and/or the scheduling update signaling, the data with the base station according to a subframe position determined by a pre-set rule, the pre-set rule comprising: determining the subframe position for transmitting the data with the base station by comparing a receiving time of the pre-scheduling signaling with a time of obtaining resource by competition; a sixth transmission unit, configured to transmit, when subframe position instruction information for instructing a subframe position for transmitting the data with the base station exists in the pre-scheduling signaling and/or the scheduling update signaling, the data with the base station according to the subframe position instructed by the subframe position instruction information; and a seventh transmission unit, configured to transmit the data with the base station on a nearest uplink subframe after the UE obtains resources by competition.

\* \* \* \* \*